United States Patent [19]

Hauk et al.

[11] 4,099,405

[45] Jul. 11, 1978

[54] APPARATUS AND METHOD FOR TESTING PIPES FOR LEAKS, AND SEALS THEREFOR

[75] Inventors: Thomas D. Hauk, Huntington Beach; Ernest D. Hauk, Signal Hill, both of Calif.

[73] Assignee: Service Equipment Design Co., Inc., Signal Hill, Calif.

[21] Appl. No.: 640,190

[22] Filed: Dec. 12, 1975

[51] Int. Cl.² ............................ G01M 3/28; F17D 3/04
[52] U.S. Cl. .......................................... 73/46; 73/49.1; 277/2
[58] Field of Search ............ 73/49.1, 46, 49.5, 40.5 R, 73/49.8; 138/99; 277/2, 9.5, 34.6; 285/18, 93

[56] References Cited

U.S. PATENT DOCUMENTS 3,975,945  8/1976  Hauk et al. ........................ 73/49.1 X

FOREIGN PATENT DOCUMENTS 1,410,584  10/1975  United Kingdom .................. 73/49.1

Primary Examiner—Richard C. Queisser
Assistant Examiner—Joseph W. Roskos
Attorney, Agent, or Firm—Richard L. Gausewitz

[57] ABSTRACT

The present apparatus, method and seals relate to an external tester for defining a sealed chamber around a pipe joint, such chamber then being filled with fluid under very high pressure. After introduction of fluid into the test chamber is terminated, a determination is made as to whether or not the pressure is reducing —any such reduction indicating that a leak is present in the pipe joint. To define a test chamber which is perfectly sealed so that fluid will not escape otherwise than through a leak in the pipe joint, there are provided longitudinal sealing elements and arcuate seal segments of special construction. The longitudinal and arcuate sealing elements interrelate with each other and with extrusion-prevention and index elements in such manner that no cracks remain through which the fluid may escape.

The longitudinal and arcuate sealing elements have molded therein compression and mounting elements which provide initial sealing compression even prior to the time that the casing is closed about the pipe to be tested. Then, when the casing is closed there is augmented sealing compression created by the closing, following which injection of the fluid into the test chamber creates final sealing compression to complete sealing of the test chamber to such an extent such that tens of thousands of psi of water may be introduced without leaking.

59 Claims, 20 Drawing Figures

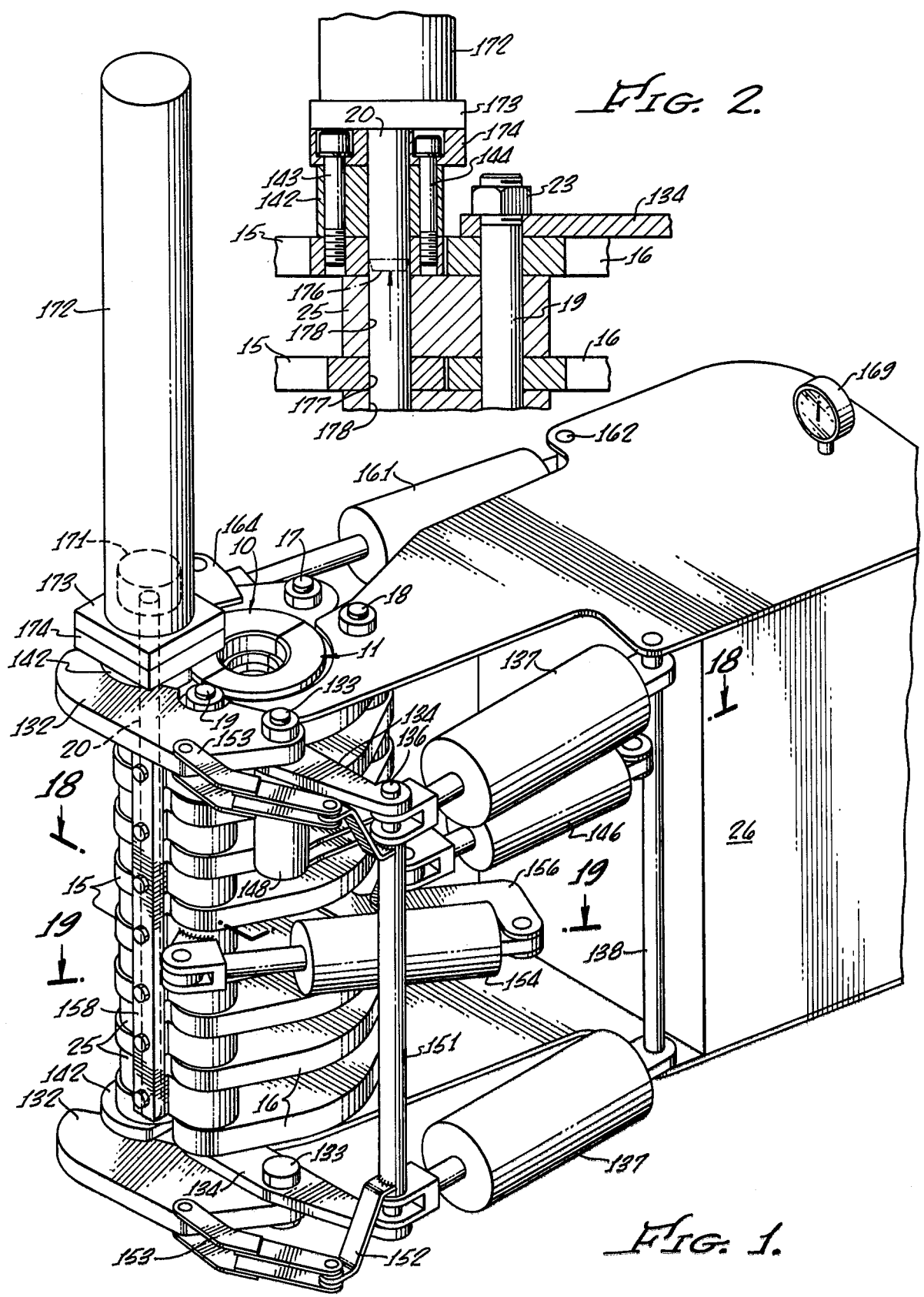

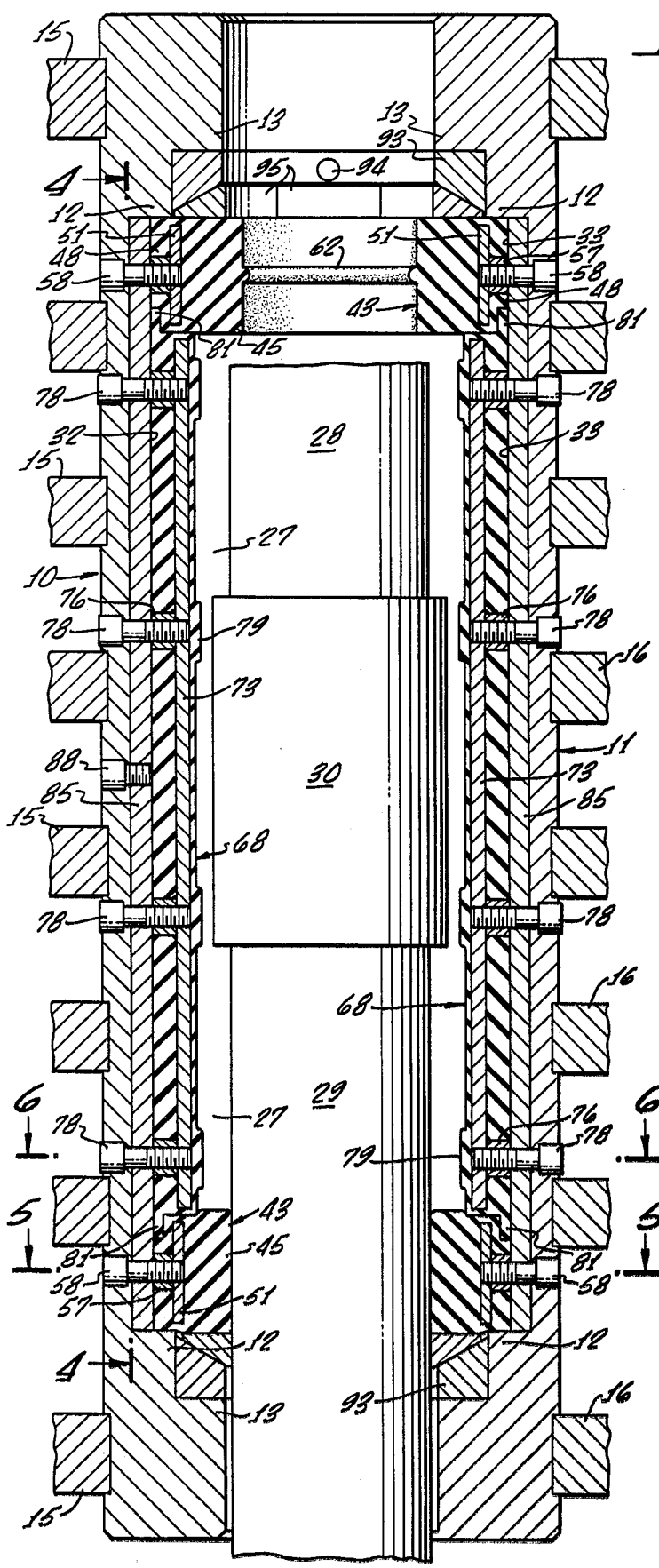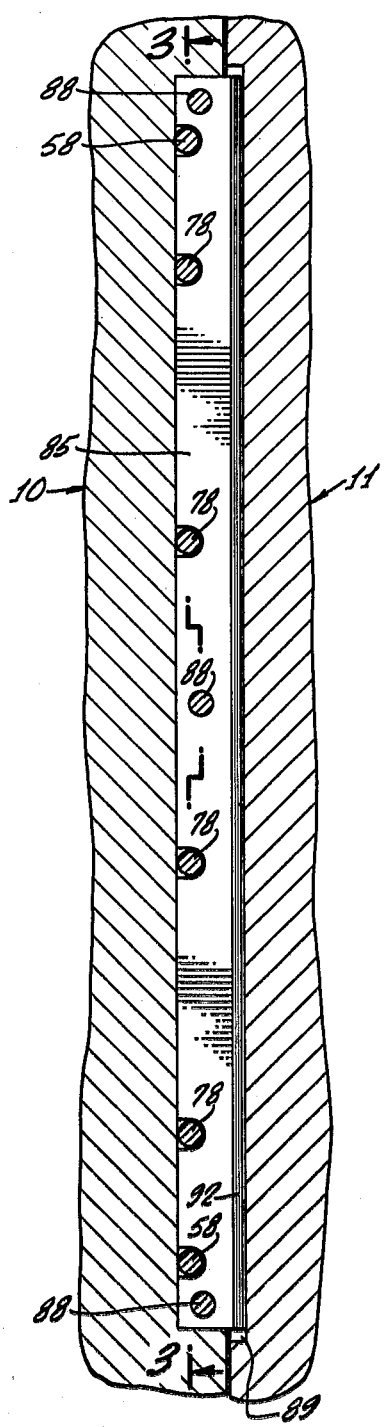

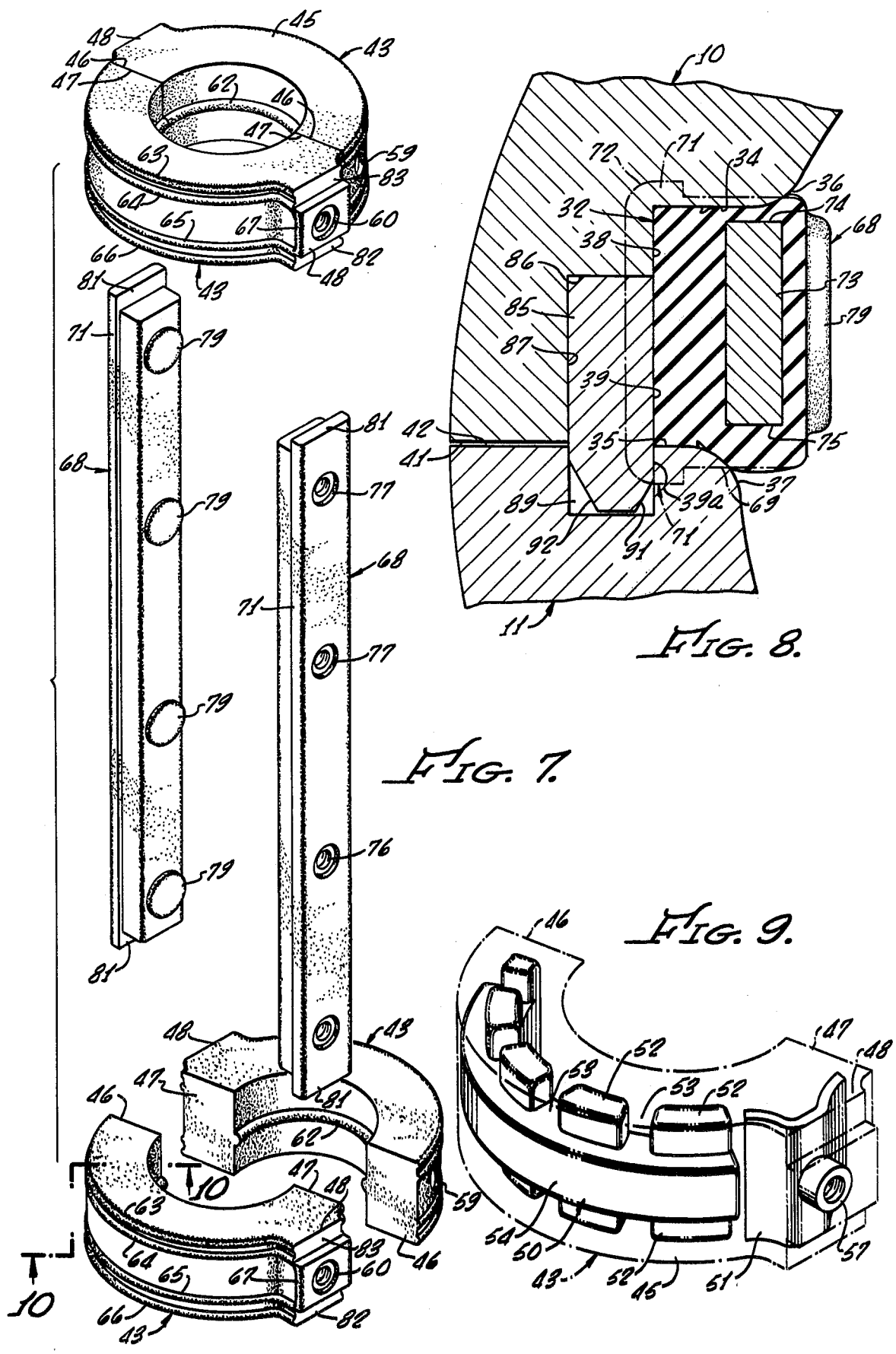

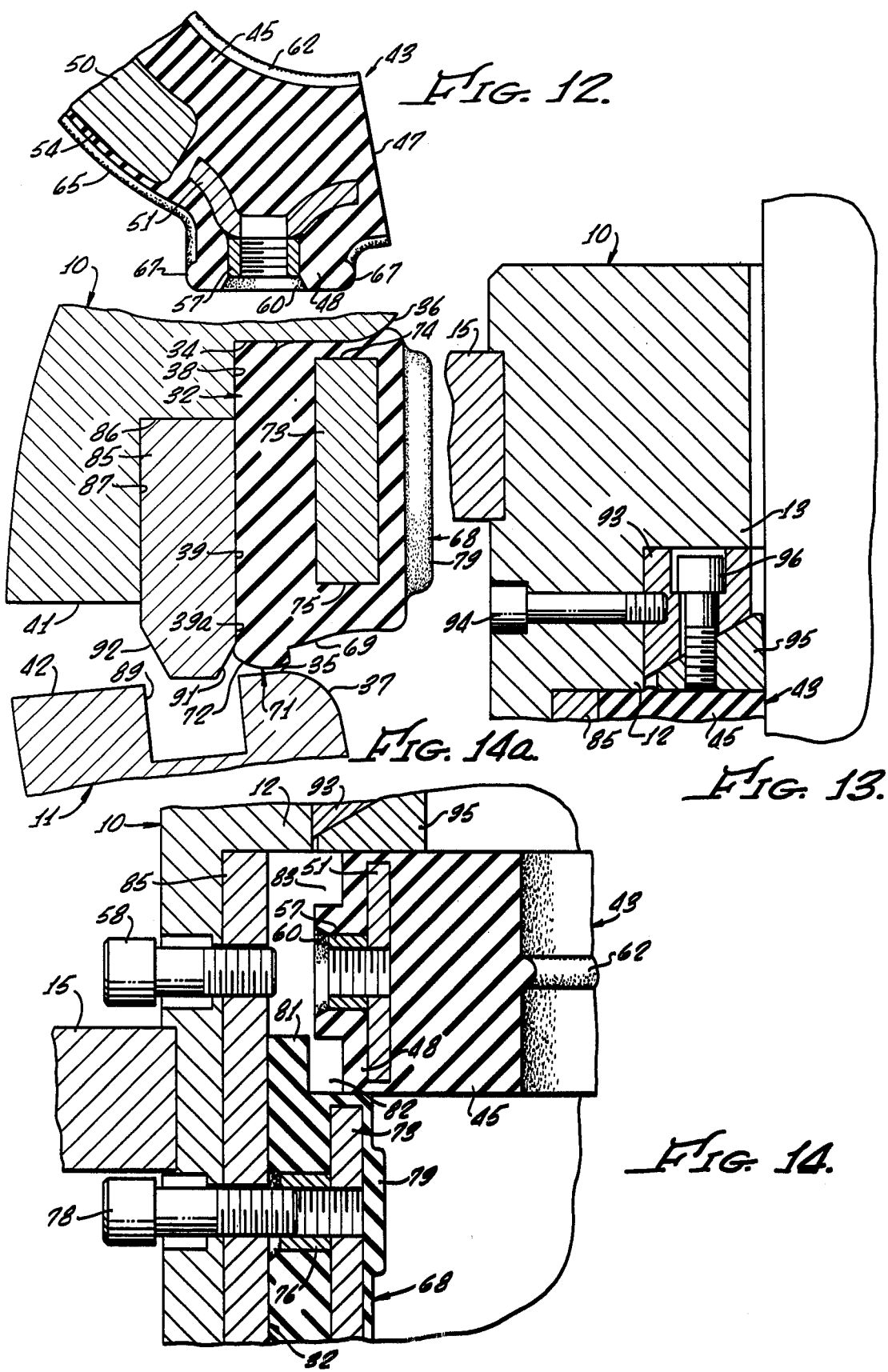

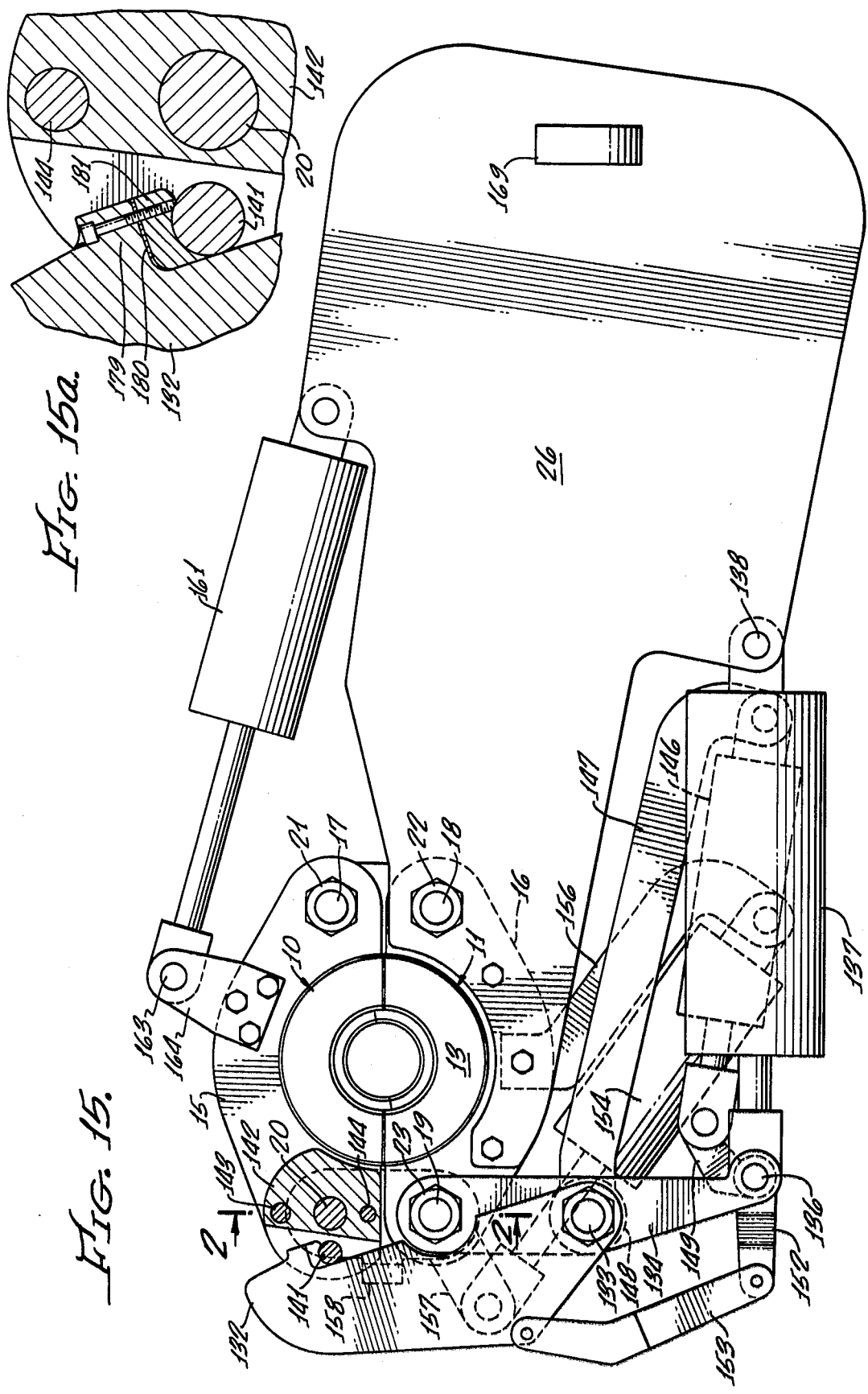

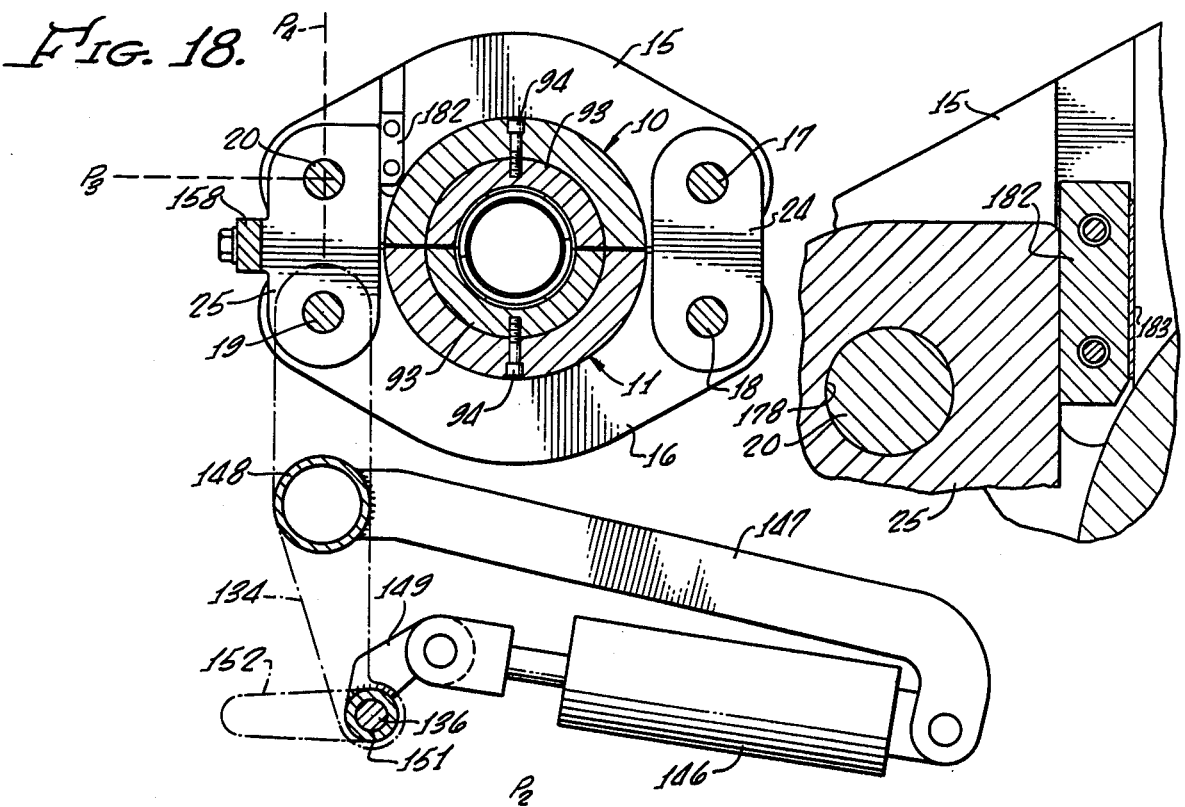
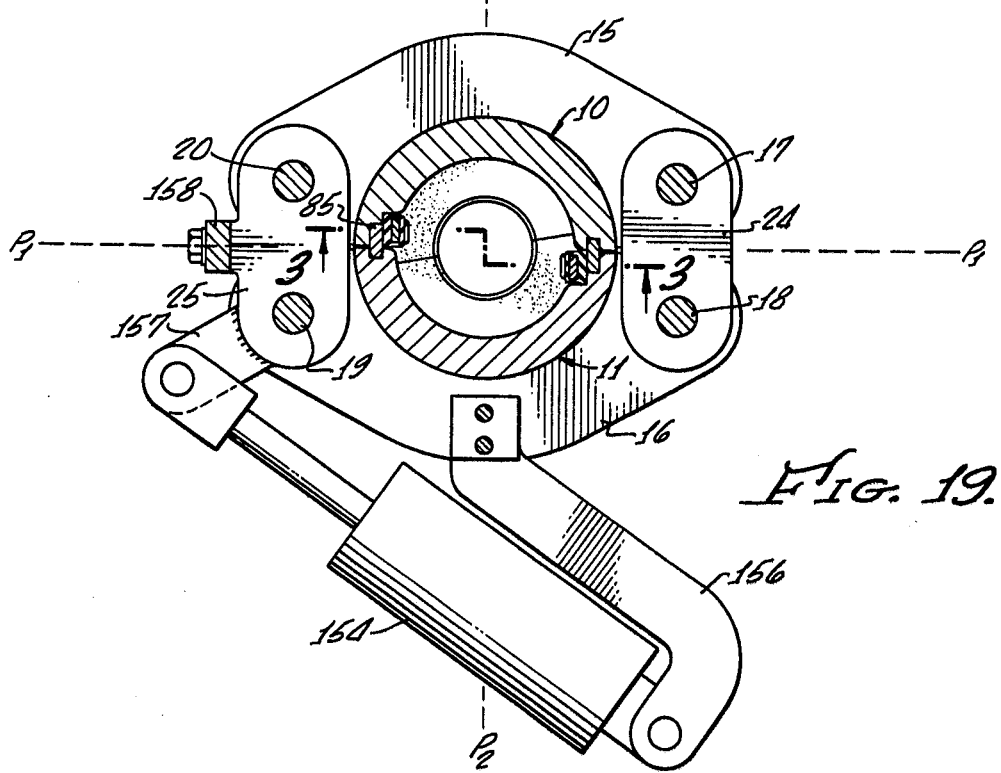

APPARATUS AND METHOD FOR TESTING PIPES FOR LEAKS, AND SEALS THEREFOR

BACKGROUND OF THE INVENTION

1. Field of the Invention

This invention relates to the field of apparatus and methods for creating sealed test chambers externally around pipe sections etc., the seals being that many thousands of psi pressure may be contained in the chambers.

2. Description of Prior Art

There exist substantial numbers of prior-art patents for apparatus wherein longitudinal and circumferential seals are provided in order to permit a sealed chamber to be defined around a section of pipe. Patents of this type include, for example, U.S. Pat. Nos. 2,255,921 and 3,744,822. However, the construction set forth in these and other patents are believed to be incapable of containing and sealing fluid pressures anywhere near as high as those which may be contained and sealed with the present apparatus, method and seals. It is to be understood that the higher the test pressure, the more readily and rapidly a leak may be detected.

It is extremely important that the apparatus be adapted to open and close rapidly, to laterally receive a pipe section when the apparatus is in open condition, and to seal a pressure of such extreme magnitude that even minute leaks will be readily apparent in a short test period.

Insofar as applicants are aware, the only prior-art external-tester apparatus which has achieved major commercial success in the oil-well industry is that described in U.S. Pat. No. 3,371,521, and improvements thereon which are specified in a notice of prior art filed in the present application file. Such apparatus is, however, deficient in important respects one of which is that it requires a unitarily-molded complex packer as shown in FIG. 9 thereof. The packer is such that the fluid in the test chamber only "sees" rubber, as stated in column 5 of such patent, starting at line 39. The packers of the type shown in FIG. 9 of U.S. Pat. No. 3,371,521 are not only complex and expensive to mold but also bulky to ship and store. Furthermore, when one portion of the packer wears out, the entire packer must be discarded, it being impractical or impossible to replace any worn portion of the packer. A further disadvantage relative to such packers is that they are sometimes difficult to load into the casings in the field, this being because (as set forth starting at line 75, column 6 of the patent) the as-molded packer circumference at its exterior is larger than the circumference of the closed casing at its interior.

It has long been thought impossible to create an external pipe tester which opens for lateral reception of the pipe and is capable of containing extremely high fluid pressures, yet is sealed by individual sealing elements which (a) are readily mass produced, shipped and stored, (b) are easily mounted in the casing in the field, (c) are individually replaceable when worn, and (d) may be made in small common molds.

SUMMARY OF THE INVENTION

The present apparatus and method comprise at least two end seals at each end of the test chamber, and at least two strip seals extending between the sets of end seals. Each of the end seals and strip seals incorporates relatively rigid molded-in elements adapted to be employed in creating initial compression and also in controlling the flow of the rubber under pressure.

In accordance with one important aspect of the invention, each strip seal engages an associated end seal in a predetermined relationship such that effective initial compression may be created at the region of engagement. The engagement occurs at a location spaced from the regions where the two end seals (in each set thereof) meet each other, so that there need be no sliding movement between the strip and end seals when the apparatus is opened for lateral reception of the pipe to be tested.

The apparatus and method further effect the creation of initial sealing compression between each seal element and the casing even prior to the time that the casing is closed. Such initial sealing compression is then augmented upon closing of the casing. The injection of high-pressure fluid into the test chamber then increases the sealing compression and, by a self-energization process, creates final sealing against leakage of the fluid from the chamber.

The seal strips, and portions of the end seals at which the seal strips overlap the same, are provided in groove means in the casing of the apparatus. This permits more effective creation of initial sealing compression as well as augmented and final sealing compression. The strip seals, and critical regions of the end seals, are backed up by longitudinal extrusion-prevention bars which are so related that even stretching of the casing under extremely high fluid pressures does not permit extrusion of rubber therefrom. These extrusion-prevention bars further serve as index bars creating precise registry between opposed casing sections in order that locking may be achieved in the best manner possible.

BRIEF DESCRIPTION OF THE DRAWINGS

FIG. 1 is an isometric view showing the present leak-testing apparatus in closed condition;

FIG. 2 is a fragmentary vertical sectional view taken on line 2—2 of FIG. 15, illustrating in fully-retracted condition the lock pin for the casing;

FIG. 3 is a vertical sectional view taken on the broken line 3—3 of FIG. 19, illustrating in vertical sectional view the seal means, the showing at the bottom of FIG. 3 being after the apparatus is clamped on a pipe to be tested, the showing at the top of FIG. 3 being prior to the time the apparatus is clamped on the pipe to be tested;

FIG. 4 is a fragmentary vertical sectional view taken on line 4—4 of FIG. 3;

FIG. 7 is an isometric view showing the various sealing elements of the present apparatus and method, but not showing the associated extrusion-prevention elements;

FIG. 8 is an enlarged horizontal sectional view corresponding generally to the left portion of FIG. 6, but taken at a different elevation at which there is no screw, there being illustrated in phantom lines in FIG. 8 the cross-sectional shape of the vertical seal strip prior to application of any compression;

FIG. 9 is an isometric view showing in phantom lines one of the arcuate seal segments, and showing in solid lines the inserts contained in such segment;

FIG. 12 is a fragmentary horizontal sectional view showing, among other things, the beads on one of the arcuate seal segments;

FIG. 13 is a vertical sectional view illustrating the longitudinal-extrusion prevention means for the arcuate seal segments;

FIG. 14 is an enlarged sectional view illustrating the upper-left region of FIG. 3, before completion of seal mounting or application of any compression;

FIG. 14a is a view corresponding generally to FIG. 8, but when the casing is in the act of closing and is not yet closed;

FIG. 15 is a top plan view illustrating the apparatus in fully-closed condition, a showing of the lock-pin cylinder being omitted;

FIG. 15a is an enlarged fragmentary sectional view of the upper-left region of the showing of FIG. 15;

FIG. 18 and FIG. 19 are horizontal sectional views taken, respectively, on lines 18—18 and 19—19 of FIG. 1; and FIG. 18a is an enlarged sectional showing of the upper-left portion of FIG. 18.

BRIEF DESCRIPTION OF THE PREFERRED EMBODIMENT

DEFINITIONS

Figure 5:
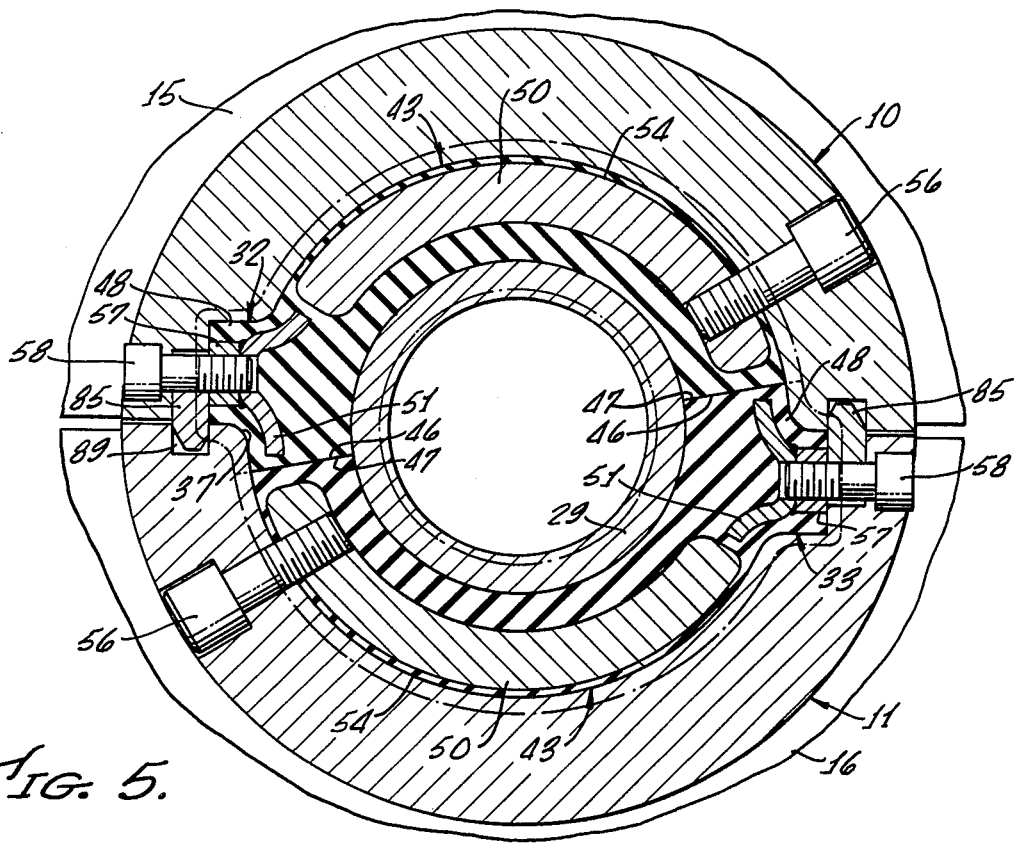
FIG. 5 and FIG. 6 are horizontal sectional views taken respectively, on lines 5—5 and 6—6 of FIG. 3.

In the following specification and claims:

The word "cylinder" denotes a piston and double-acting cylinder assembly with associated lines, valve, etc.

The word "rubber" denotes any natural or synthetic rubber, or other elastomeric (or plastic) material having the general characteristics of rubber.

The "initial sealing compression" is that amount of compression which is present in the mounted seal elements when the casing is open. The "augmented sealing compression" is that degree of compression which is present in the sealing elements when the casing is fully closed. The "final sealing compression" is that amount of sealing compression present in the sealing elements when there is maximum fluid pressure in the test chamber.

DETAILED DESCRIPTION OF ELEMENTS OTHER THAN THE SEALING ELEMENTS, AND OTHER THAN THE OPENING AND CLOSING MECHANISM

Referring to the drawings, the apparatus comprises two semi-cylindrical casing sections 10 and 11 the upper and lower ends of which are doubly necked-down as indicated at 12 and 13 in FIG. 3. The casing is greatly and uniformly strengthened and reinforced by a symmetrical cage formed of opposed ribs which are respectively welded to casing sections 10 and 11, the cage also being formed of opposed bars which extend between pins through the ribs.

Stated more specifically, one set of parallel ribs is numbered 15 and is welded externally to casing section 10 at substantially uniformly-spaced points therealong and preferably in shallow grooves therein. The second set of parallel ribs is numbered 16, being welded to casing section 11 and being the mirror image of ribs 15.

Extended through the ends of ribs 15–16 are four pins 17–20. Three of such pins, numbers 17–19, are permanently fixed in position as by nuts 21–23 (FIG. 15) at their ends. The fourth pin, number 20, is a retractable lock pin which is cylinder operated as described subsequently.

The opposed pins 17 and 18 at the rear of the cage (the "rear" being the portion diametrically opposite the region which opens to receive a section of pipe to be tested) are connected by hinge bars 24 (FIGS. 1 and 18–19). The pins 19 and 20 at the front of the cage are connected by lock bars 25 which are pivotable as stated below. Hinge bars 24 and lock bars 25 are sufficiently thick to fill in the spaces between the adjacent ones of ribs 15 and 16, the result being that all of the pins 17–20 are in total shear and are not subjected to bending stresses.

The described cage is symmetrical about two planes which are perpendicular to each other and intersect at the axis of the apparatus. Such planes are shown at $P_1$ and $P_2$ in FIG. 19. Because of such symmetry, the two ribs 15 and 16 shown in FIG. 19 are directly opposite each other and lie in the same plane which is perpendicular to the axis of the apparatus. Similarly, the two bars 24 and 25 shown in FIG. 19 are directly opposite each other and are in the same plane perpendicular to the axis of the apparatus.

The word "symmetry" as employed in the present specification and claims denotes not only those situations (such as the present one) wherein the ribs and bars are substantially identically shaped, but also those situations wherein the ribs and bars are differently shaped. Thus, for example, if the lock bar 25 shown in FIG. 19 were twice as wide as is shown in such figure, with hinge bar 24 remaining the same shape as is shown in such figure, there would still be symmetry about plane $P_2$ as the word "symmetry" is employed in this specification and claims.

The described cage, etc., are connected to a suitable valve housing indicated at 26 in FIG. 1, and are suitably suspended by means (not shown) at the wellhead of an oil well. The upper and lower walls of the valve housing 26 extend forwardly and are bolted, respectively, above the uppermost one of ribs 16 and below the lowermost one of such ribs.

in order that the casing formed by elements 10–11 and associated parts may define a sealed chamber (the "test chamber") around a section of pipe, seal means are provided within the casing as described below. Referring, for example, to FIG. 3, the apparatus is particularly adapted to define an annular test chamber 27 around a pipe section formed by two pipe elements 28 and 29 which are connected by a threaded collar 30. Such pipe may be drill pipe, casing pipe, etc. As described under such subheading, the seal means is primarily rubber and includes protruding portions which are compressed (to form the "augmented sealing compression") in response to closing of the casing as described below. Thus, closing of the casing requires a very substantial amount of force in order to overcome the resistance provided by the rubber and to create the stated augmented sealing compression.

The mechanisms for opening and closing the casing, and locking the same, are described in detail subsequently relative to FIGS. 15 et seq.

DESCRIPTION OF THE SEALING ELEMENTS

There are formed longitudinally in the respective casing sections 10 and 11, for substantially the full lengths thereof (namely, between the necked-down regions 12, FIG. 3) groove means 32 and 33 which are preferably diametrically opposite each other. Such groove means are adapted to receive rubber seal elements, as well as portions of the inserts in such elements. The groove means presently referred to are those for the rubber seal elements, not for the extrusion-prevention and index bars 85 described later in this specification.

Referring particularly to FIG. 8, the illustrated groove means 32 has one generally radial side wall 34, formed by casing section 10, and an opposed generally radial side wall 35 formed by casing section 11. Thus, the groove means 32 is located at the interior casing edges, where the casing sections are adjacent each other. The respective walls 34 and 35 merge through rounded edge regions 36 and 37 with the generally cylindrical interior surfaces of the casing sections 10-11. The walls 34-35, including the adjacent portions of the rounded regions 36-37, form the side walls of the groove means 32.

Again referring to FIG. 8, part of the bottom wall of the groove means 32 is formed by a wall 38, such wall being a portion of casing section 10. The remainder of the bottom groove wall is formed by a wall portion 39, such wall portion 39 being flush with wall 38 and being the inner surface of an extrusion-prevention and index bar 85 described hereinafter.

The wall 35, which has a smaller generally radial dimension than does wall 34, is generally coplanar with the opposed edge faces 41-42 of the respective casing sections 10—11.

Figure 6:
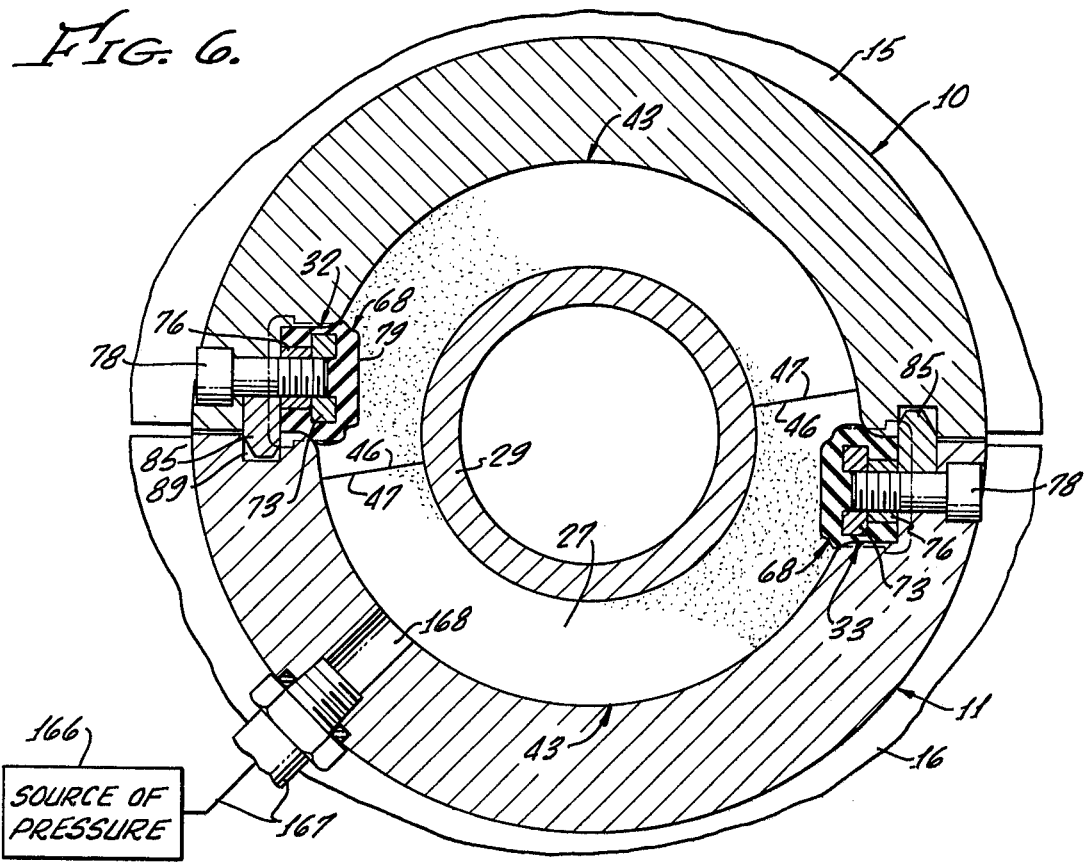

The above description of the groove means 32, given relative to FIG. 8, applies also to the groove means 33 since (as shown in FIGS. 6 and 19) the parts are corresponding. Thus, the groove means 32 is formed primarily in casing section 10 whereas the groove means 33 is formed primarily in casing section 11.

The relationship stated in the previous paragraph is one aspect of a feature of the present apparatus whereby the casing sections 10 and 11 and associated parts are substantially identical to each other. Furthermore, the opposed longitudinal seals 68 (described below) are substantially identical to each other, as are arcuate seal segments 43 at the ends of the test chamber. The present apparatus is characterized by a large proportion of interchangeable parts, all of which facilitates manufacturing, shipment, storage, inventory control, etc.

Seal elements are provided at each end of the test chamber 27, and comprise the arcuate seal segments 43 one of which (at each casing end) is mounted in casing section 10 and the other of which is mounted in casing section 11. It is (as above stated) a feature of the present apparatus that such seal segments 43 can be, and preferably are, identical to each other so that they are made in the same mold. Preferably, there are two such segments, as illustrated, and each occupies substantially 180° (when the casing is closed) of the circumference of the apparatus. Since segments 43 are identical, they have been given the same general reference numeral. They are described in detail with particular reference to FIGS. 5, 7, 9, 10-12 and 14.

Each segment 43 is generally rectangular in cross-sectional shape, being disposed adjacent the first necked-down region 12 of a casing section 10 or 11. Each segment is formed primarily of rubber, and extends (prior to compression) for substantially more than 180° in order that there will be a major amount of sealing compression between the ends of the segments when the casing is closed. Although each segment extends for substantially more than 180° of a circle, there is no difficulty in mounting the segments in position since they are not connected to each other and since mounting is effected when the casing is open.

The rubber body 45 of each seal segment has two end faces which are illustrated as lying generally in radial planes, such end faces being numbered 46 and 47 (bottom of FIG. 7). It is these faces which are in very close bearing engagement with each other when the casing is closed, thus preventing leakage of fluid therebetween.

The engaged end faces 46 and 47 are preferably not radially adjacent the edge faces 41-42 of the closed casing sections. Such engaged end faces 46-47 are instead, when the casing is closed, spaced somewhat from outwardly-extending protruberances 48 one of which is formed on each arcuate seal segment 43, which protruberances 48 nest in the ends of the respective groove means 32 and 33 described above.

There are molded into the each rubber body 45 two inserts 50 and 51 which perform numerous functions including permitting creation of initial sealing compression (as that term is described at the beginning of this specification under "Definitions"). Insert 50 is generally arcuate, one end thereof being spaced a short distance from protuberance 48. As best shown in FIG. 9, the upper and lower surfaces of insert 50 have spaced teeth 52 thereon. The gaps 53 between the teeth 52 are sufficiently large to permit a certain amount of flow of rubber through such gaps when the arcuate seal segment is under very high loads.

Figure 10:
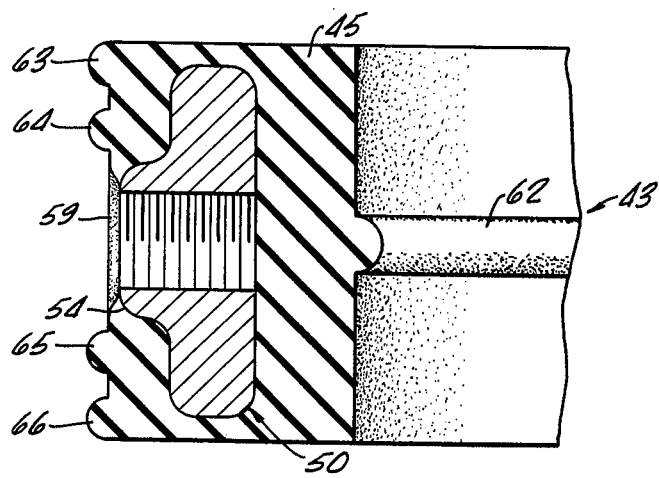
FIG. 10 is a vertical sectional view on line 10—10 of FIG. 7.

Insert 50 is bored and threaded, at the end thereof remote from protuberance 48, to receive a screw 56 (FIG. 5) which extends inwardly through the associated casing section. Such screw is one of the two screws not only effecting mounting but also creating initial sealing compression in the arcuate seal segment, as described below. Reference is made to FIG. 10, showing the internally-threaded radial bore for the screw 56.

The second insert 51 is generally wing-shaped, or clip-shaped, having two angularly-related wings which are somewhat spaced, respectively, from the rounded edges 36 and 37 (FIG. 8) of each groove means 32 and 33.

An internally-threaded bushing 57 is welded to the wing-shaped insert 51 at the outer central portion thereof and extends radially-outwardly toward the bottom wall of the groove means 32 or 33 in which the protuberance 48 is disposed. A second screw 58 extends radially-inwardly through the casing and is threaded into bushing 57 to perform functions including (1) achievement of initial sealing compression, and (2) the mounting function.

As shown in FIGS. 12 and 14, the outer surface of bushing 57 is not flush with the outer surface of segment body 45 (at protuberance 48) prior to application of initial sealing compression forces. Instead, there is a very substantial indentation or recess in the rubber prior to application of initial sealing compression.

Also, as shown in FIGS. 5 and 10, there is a substantial spacing between the entire outer surface 54 of insert 50 and the outer vertical surface of segment body 45. Thus, the parts do not assume the positions shown, for example, in FIG. 5 until both of the screws 56 and 58 have been tightened in order to cause a substantial degree of compression of the rubber, thus creating the "initial sealing compression" previously referred to. Recesses 59 and 60 (FIGS. 7, 10 and 12) in the rubber permit the screws 56 and 58 to enter inserts 50 and 51.

The bushing 57 only permits the initial sealing compression to be increased until the bushing seats, so that there is a predetermined initial compression or sealing force at such region.

The bushing 57 seats on the bottom of the groove 32 or 33 in which it is mounted. The outer surface 54 of insert 50 does not seat on the cylindrical internal surface of the casing section, but is relatively close thereto after screw 56 has been turned a predetermined desired number of times.

It is emphasized that the wings of the insert 51, which wings are preferably rounded correspondingly to the rounded edges 36 and 37 (FIG. 8) of the groove, provide a great deal of compression relative to such rounded edges 36 and 37 to thus prevent passage of water or other fluid through such regions.

Referring particularly to FIG. 10, the internal surface of each segment body 45 is provided with an annular bead 62, whereas the outer surface is provided with four beads 63–66, two being above the recess 59 and two being below the same. Bead 62 projects radially inwardly for pressure engagement with the internal cylindrical surface of the casing section. The beads provide regions of especially high pressure, which augments the sealing action at the beaded regions.

There are shown in phantom lines in FIG. 5, which figure shows the arcuate seal segments 43 after the casing has been closed on the pipe 29, the approximate positions where the outermost portions of the various beads 62 and 63–66 would be if there were no compression. It will thus be seen that there is a great deal of radial and circumferential compression against the interior walls of sections 10–11, against the three walls of each groove means 32–33, and against the pipe. The radial-outward compression is effected first by tightening of the screws 56 and 58 as described above. Compression is augmented, both outwardly and inwardly, and circumferentially on portions 48, when the apparatus is closed on the pipe to create the augmented sealing compression defined above. Finally, when the fluid is introduced at many thousands of psi pressure into the test chamber 27, such fluid compresses longitudinally (namely, upwardly and downwardly as viewed in FIG. 3) and effects a squeezing action which causes additional flow of the rubber to further augment the sealing action at the arcuate seal segments 43.

There are thus (as indicated above) three stages of sealing, namely prior to closing of the casing, after full closing of the casing, and after injection of high-pressure fluid into the test chamber, and these three stages build up extremely high sealing pressures adapted to prevent leakage of fluid outwardly from the test chamber despite the fact that the pressures are enormously high as indicated.

Each arcuate insert 50 is preferably formed of aluminum or some other lightweight material, although it may be formed of steel, nylon, etc. The insert (or clip) 51 is preferably formed of steel.

Referring next to FIGS. 6 and 7–8, there are two identical longitudinal seal strips 68 adapted to be received in the above-described groove means 32 and 33 between the arcuate seal segments 43. Furthermore, portions of the seal strips overlap the seal segments in predetermined sealing relationship as described in detail below.

Each longitudinal seal strip 68 comprises an elongated mass of rubber which has, when not compressed in any way, the cross-sectional shape indicated in phantom lines at 69 in FIG. 8. Thus, as illustrated, the uncompressed cross-sectional shape is generally rectangular, with radially-outwardly extending flanges 71 relatively adjacent the bottom of the associated groove 32 or 33. Each such flange is rounded at 72, at its corners most remote from the pipe. In summary, therefore, the cross-sectional shape of each seal strip 68 is generally T-shaped, the stem of the T being extremely wide relative to the length of the cross member.

Molded into each seal strip 68 is an insert bar 73 of rectangular section, the ends of such bar being relative close to (but spaced somewhat from) the ends of the seal strip as shown in FIG. 3. One edge of insert bar 73, which edge is numbered 74 in FIG. 8, is relatively close to the corresponding side of the rubber seal strip body (which side is shown in phantom lines in FIG. 8). The other edge 75 of the insert bar is relatively remote from the corresponding side of the seal strip body.

Welded at spaced points along the insert bar 73 are internally-threaded bushings 76, FIGS. 3 and 14, the outer ends of such bushings being recessed beneath the outer surface of the seal strip prior to application of compression forces. These recesses are best shown at 77 in FIG. 7. Thus, it is not until screws 78 (FIG. 3) have been threaded into bushings 76, and tightened, that the bushings 76 are drawn outwardly until they seat on the bottom wall of the associated groove 32 or 33 as shown in FIG. 3. The regions of the rubber body of each seal strip inwardly of each screw end are made inwardly protuberant, as shown at 79, to aid in sealing around such screw ends. In the manner described above relative to screws 58 employed relative to the arcuate seal segments, the bushings 76 provide a stop function which insures against excessive compression of the rubber by the screws 78.

The longitudinal seal strips 68 are readily mounted to the casing sections 10 and 11 when the casing is in open condition. FIG. 14 shows one of the seal strips 68 in the process of being mounted, whereas FIG. 8 shows in solid lines a seal strip after the casing has been closed and the seal strip thus compressed between the opposed side walls 34 and 35 of the groove means 32 or 33.

To mount each longitudinal seal strip, it is merely necessary to insert screws 78 and then tighten them until the bushings 76 seat on the bottom wall of the associated groove means. This tightening of the screws causes collapsing of one of the flanges 71 (FIGS. 7 and 8) of the seal strip, such one flange being the one relatively adjacent the corner between the groove surfaces 34 and 38 shown in FIG. 8. The remaining flange 71 is not then laterally compressed, reference being made to FIG. 14a. However, the seal strip is compressed in a radial direction due to the clamping action exerted between insert bar 73 the the bottom wall surfaces 38–39 (FIG. 8) of the groove means. In this manner, initial sealing compression is achieved between the seal strip 68 and groove walls 34 and 38–39 (FIGS. 8 and 14a).

Thereafter, when the casing is closed, the sealing force is augmented and the remaining flange 71 is compressed greatly by groove wall 35. Such groove wall 35 also comprises protuberance 48, which in its as-molded condition is much wider than is the associated groove 32 or 33. The concentration of sealing forces is greatest in the bottom of the groove due to the presence of the two flanges 71. Then, when high-pressure test fluid is introduced into the test chamber 27, FIG. 3, the sealing forces are augmented due to radial-outward movement of the seal strips in response to the extremely high fluid pressures-thus creating the final sealing pressure.

REGIONS OF ENGAGEMENT AND OVERLAP BETWEEN THE SEAL STRIPS AND THE ARCUATE SEAL SEGMENTS

One of the most highly critical sealing regions in the entire apparatus is that region where each of the seal strips 68 engages an associated arcuate seal segment 43. It is emphasized that there is no movement between each end of a seal strip, and the associated region of the arcuate seal segment, when the casing opens and closes. The word "movement" is here employed to denote sliding, etc., as distinguished from bulging and compressing under pressure. Thus, referring to the isometric view of FIG. 7, it is again noted that the engaged radial faces or surfaces 46-47 at the ends of the arcuate seal segments are circumferentially offset from the protuberances 48, and that it is at such protuberances 48 (and in the groove means 32-33) that the longitudinal seals engage the arcuate seals.

There is provided at each end of each longitudinal seal strip 68 a tongue 81 (FIGS. 3, 7 and 14) which fits into an associated notch 82 or 83 in the protuberance 48 of the arcuate seal segment. At the regions of engagement between the seal strips and the arcuate seal segments at the top of the apparatus, the tongues 81 seat in notches 82 (which are the lowermost notches). At the regions of engagement between the seal strips and the lower arcuate seal segments, the tongues 81 seat in notches 83 (which are the upper-most notches). It is within the scope of the invention to fill in the unused notch 82 or 83, with an insert of rubber or metal or some other substance, if desired.

The cross-sectional shape of each tongue 81, in a horizontal plane, is the same as that of the cross member of the T-shaped longitudinal seal strips, having the same flanges or edges 71 shown (for example) in FIG. 7. Each tongue 81 is initially compressed in the bottom of its groove 32 or 33 upon tightening of the screws 58 (FIG. 14) which move the inserts 51 radially-outwardly. Then, when the casing is closed, augmented sealing compression is created at each tongue 81 due to the bulging of the rubber bodies 45 as shown at the bottom of FIG. 3, there being a very high radial compressive force between the pipe and the bottom wall of each groove. Finally, when test pressure is caused to be present in the test chamber 27, the longitudinal and radial pressures exerted by the pressurized fluid causes compression of rubber bodies 45 and 68 and consequent additional forces which further seal at the tongues 81. In the described manner, therefore, the critical regions of engagement between the longitudinal seal strips and the arcuate seal segments are fully sealed.

Referring to FIG. 7, it is pointed out that the end faces of beads 63 and 64, or 65 and 66 (depending upon which end of the test chamber is referred to), at protuberances 48, are adapted to engage flatwise the tongues 81 at the ends of the seal strips. This creates additional sealing regions preventing leakage of fluid from the test chamber upwardly (or downwardly) along the outer surfaces of the arcuate seal segments. Such beads curve onto the protuberances 48 as shown, for example, in FIGS. 7 and 12.

There is an additional bead 67 (FIGS. 7 and 12) which extends vertically between the adjacent beads 64 and 65, at the outer region of each side of each protuberance 48. Such additional bead 67 aids in preventing leakage of fluid into the bottoms of the grooves 32-33 (FIG. 6). Bead 67 is integral with beads 64 and 65, at regions adjacent notches 82 and 83.

Secondary seals (such as O-rings) may be provided around any or all of the various screws 56, 58 and 78 to provide secondary sealing actions. Each of such screws extends through an associated casing section, and each seal may be provided (for example) in such casing section adjacent the head or shank of each screw.

In summary, therefore, the arcuate seal segments 43 and the longitudinal seal strips 68 are readily mounted in the casing when the latter is in open condition, by inserting and tightening the various screws 56, 58 and 78. Reference is again made to FIG. 14, which shows the conditions of the parts before the screws are tightened. Preferably, the longitudinal seal strips 68 are first mounted and compressed, by means of the screws 78 and as described above, until the bushings 76 seat to provide the predetermined initial sealing compression. Thereafter, the screws 56 and 58 are inserted and tightened to provide the initial radial-outward compression relative to the arcuate seal segments 43, and to provide the initial sealing compression relative to tongues 81 as described above.

The various recesses 59, 60 and 77 substantially disappear as the result of the outward movement and seating of the bushings, etc. Furthermore, during initial, augmented and/or final sealing, the various beads substantially disappear but they are nevertheless effective to provide regions of pressure concentration.

THE EXTRUSION-PREVENTION AND INDEX BARS

Referring particularly to FIG. 8, and as previously described, a portion of the bottom wall of each groove means 32 and 33 is formed by a surface 39. Such surface 39 is a major portion of the inner wall of an extrusion-prevention and index bar 85 which is seated in a recess, groove or indentation in each casing section adjacent the groove means. Such indentation is formed by perpendicularly-related walls 86 and 87 (FIG. 8).

Each extrusion-prevention and index bar extends for the full length of the associated groove means 32-33 and of the longitudinal seal means, and also adjacent the arcuate seal segments, reference being made to FIG. 3. It is held in position by screws 88 which are threaded inwardly through the casing and threaded into the bar 85, as shown at the left-center in FIG. 3 and at various portions of FIG. 4. The inner edge of each bar 85 is provided with various notches in order to receive the above-described screws 58 and 78 as shown in FIG. 4.

Again referring to FIG. 8, the bar 85 is not flush with face 41 of the casing section in which it is mounted, but instead extends outwardly a considerable distance so that it may penetrate into a rectangularly-sectioned groove 89 formed in the opposite casing section. The protuberant edge of bar 85 is a close fit in groove 89 at the regions of such groove adjacent face 42. Furthermore, as shown in FIG. 8, there is a considerable amount of overlapping or underlapping between the groove wall 39 and the wall 35 of the casing section, which wall 35 is at right angles to wall 39. Therefore, when the casing stretches due to the presence of extremely high fluid pressures therein, such stretching does not create or enlarge any gap; therefore, the extrusion-prevention action of the right-angle regions of intersection between surfaces 39 and 35 remains constant despite such stretching. Surface region 39a, the surface region in groove 89, is (due to the close fit) in close flatwise engagement with the inner wall of groove 89.

To aid in the indexing and other functions, and prevent rubber pinching and damage, each bar 85 is beveled at its protuberant edge portions. There is a short bevel 91 (relatively adjacent the center of the apparatus) and a long bevel 92 (relatively adjacent the outside of the apparatus). Neither of such bevels is so large that any portion thereof is outside of groove 89 when the apparatus is fully closed. The bars 85 do not normally seat on the bottoms of grooves 89, nor do casing faces 41 and 42 normally engage each other. The exact closed condition of the casing is instead determined by means stated subsequently.

The region 39a which overlaps the opposite casing section further serves the purpose of providing a back-up for the seal strip 68 (at the lower flange 71, as viewed in FIG. 8, of such seal strip) when the casing is closing as shown in FIG. 14a. Thus, when the casing closes, the lower flange 71 (FIG. 8) is not pinched between opposing masses of metal but instead is smoothly compressed to the position shown in full lines in FIG. 8. The bevel 91 aids in this back-up operation.

The bars 85 prevent radial-outward extrusion not only of the rubber in the strip seals 68 but also of the rubber in the protuberant portions 48 of the arcuate segments 43. To prevent longitudinal (upward or downward) extrusion of the rubber in such arcuate seal segments, wedge means are provided as shown in FIGS. 3, 13 and 18.

The wedge means comprises (at each end of the tool) a back-up ring (formed in two halves or segments 93 corresponding to the two casing sections 10 and 11) and which is secured in position by screws 94 as shown in FIGS. 13 and 18, such screws extending through the casing. Stated more definitely, each ring segment 93 seats in the second necked-down portion 13 (FIG. 3) of the casing end.

Movably mounted beneath the ring segments 93, which have lower (inner) inclined surfaces coverging in a direction away from the center of the test chamber, are wedge segments 95. Such segments are held in position, loosely, by screws 96, FIG. 13, and have inclined surfaces which engage and cooperate with the inner surfaces or ring segments 93. The relationships are such that longitudinally-outward (upward or downward) movement of the wedge segments 95 (resulting from creation of sealing pressures) tends to cause movement of the wedge segments 95 into extremely close abutment with the adjacent regions of the pipe, thus maximizing the longitudinal extrusion-prevention function.

As described subsequently, each bar 85 performs an indexing function insuring that the casing sections 10 and 11 mate accurately and properly, thus aiding in various important functions including the locking of the apparatus in closed condition. Each bar 85 thus serves as an additional indexing means, being additional to the indexing means described below.

APPARATUS FOR OPENING, CLOSING AND LOCKING THE CASING

Cross reference is made to application Ser. No. 591,502, filed June 30, 1975, for Apparatus for Testing Pipe for Leaks, inventors Thomas D. Hauk and Kenneth J. Carstensen. Said application is incorporated by reference herein as though set forth in full.

The means for closing the casing and creating the augmented sealing compression comprise hooks 132 one of which is mounted mear the top of the casing and one of which is mounted near the bottom thereof. Such hooks need not be nearly as strong as in the prior art, since they need not withstand the extreme loads created by pressure in chamber 27 during the test operation. Each hook 132 is pivotally connected by a short pin 133 to a lever 134, as best shown at the bottom of FIG. 1, one end of such lever 134 being pivoted to the pin 19 for lock bars 25 (FIG. 2). The other end of each lever 134, remote from pin 19, is pivoted to a pin 136 and thus to an actuating cylinder 137. Each cylinder 137 is, in turn, pivotally connected to a pin 138 which is fixed between the upper and lower walls of valve housing 26.

An intermediate edge portion of each hook 132 is recessed at 139 (FIG. 16) in order to provide clearance relative to the nut 23 on pin 19. Thus, the hooks do not pivot about pin 19 but instead about the pins 133 supported by levers 134.

Hooks 132 and the associated levers 134 form compound lever systems which, when cylinders 137 are shortened, cause the hooks to move downwardly (as viewed in FIG. 15), thus fully closing the casing and its associated cage, and creating the requisite augmented sealing compression in the seal means. The hook members hook around index and closing pins 141 shown in FIGS. 11 and 15, which pins are provided in grooved blocks 142 (FIG. 11) mounted by bolts 143 and 144 on the uppermost and lowermost ribs 15.

Contráry to prior-art apparatus wherein the lever systems are such that the hooks move over center, the present systems formed by hooks 132 and levers 134 preferably do not move over center. Thus, and referring to FIG. 15 which shows the apparatus fully closed, it is pointed out that a straight line extending from the axis of index pin 141 to the axis of pin 133 is on the side of the axis of pin 19 remote from casing elements 10-11. This is a very desirable feature since it means that, in the event of malfunction of the pin 20 which locks the cage (and thus the casing) in closed condition during the test procedure, there will still be no dangerous breakage of any portions of the hooks 132. Instead, a buildup of pressure in test chamber 27 will eventually (and previous to the time an excessive pressure is reached) operate to cam open the apparatus by causing the pins 141 to cam away from the hooks 132. The casing then opens, together with its associated seal means, and releases the test pressure before any damage is done. If, on the other hand, the hooks pivoted over center, the center being the axis of pin 19, then a malfunction of the lock pin 20 (causing it to remain in unlocking position) would not permit the pressure to cam open the casing but would instead result in hook breakage and consequent danger due to flying metal.

It is emphasized that pins 141 are close to lock pin 20, which enhances the cooperation between these elements.

Figure 16:
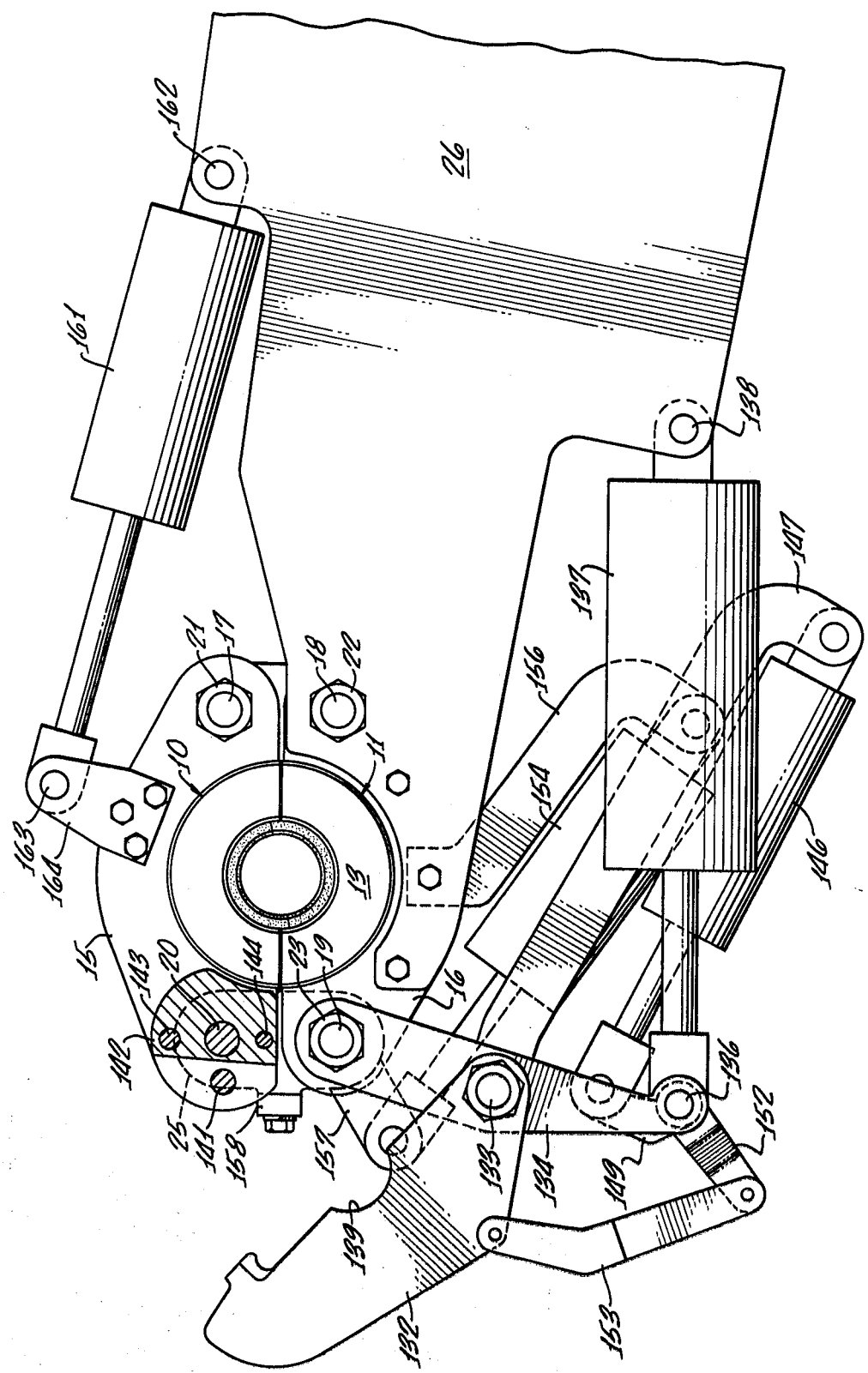
FIG. 16 and FIG. 17 are plan views corresponding to FIG. 15 but showing different positions of the parts.
Figure 17:
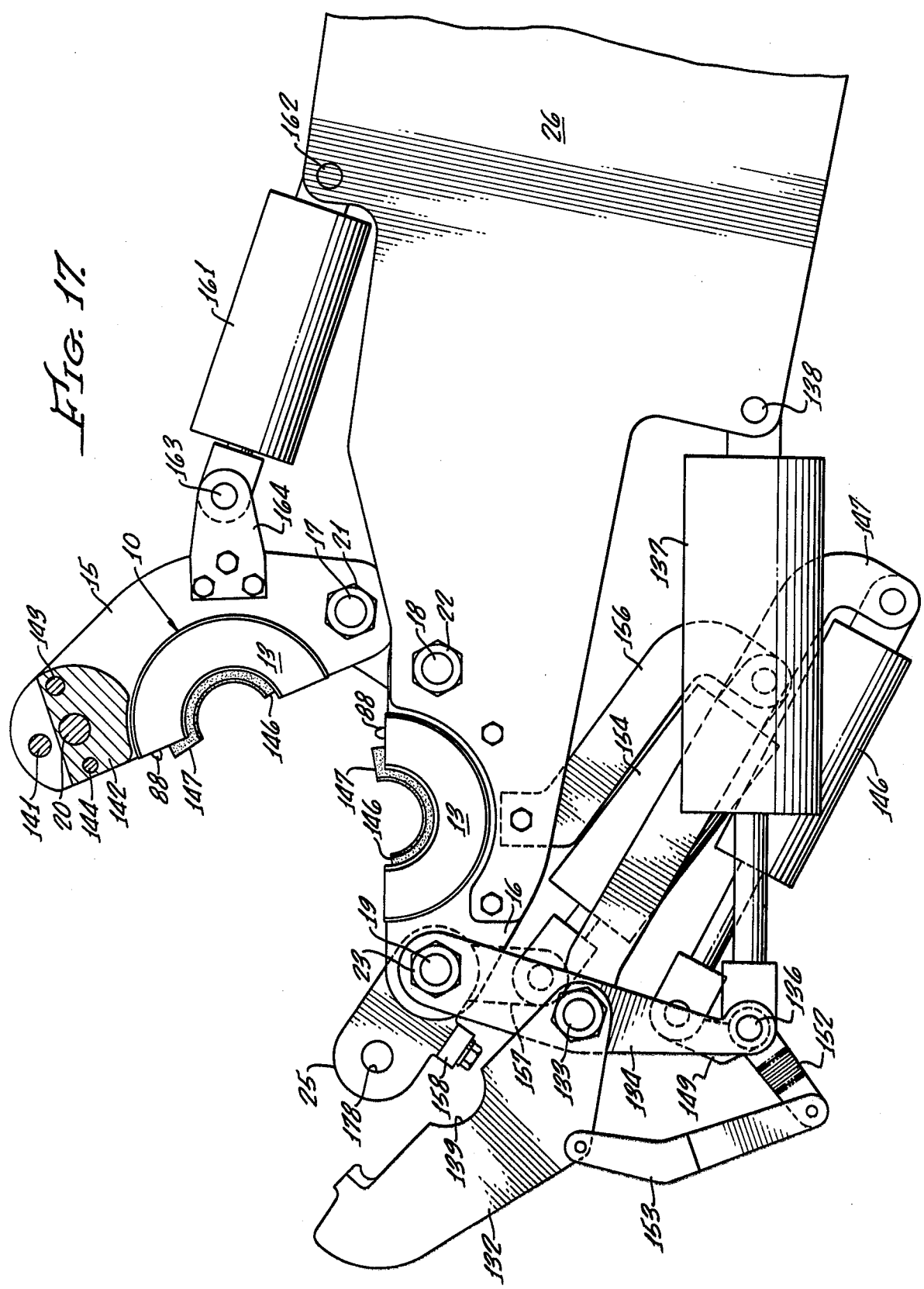

When the hooks 132 are in positions such that they do not bear against their associated pins 141, the hooks may be pivoted to the wide-open positions shown in FIGS. 16 and 17 due to operation of a cylinder 146 best shown in FIGS. 1 and 18. One end of cylinder 146 is pivoted to a bracket 147 which is welded to a tube 148. Tube 148 is, in turn, welded to the underside of the top lever 134.

The other end of cylinder 146 is connected to a crank 149 on a sleeve 151 which is rotatably mounted on pin 136. Welded to the upper and lower ends of sleeve 151 are additional cranks 152 which pivotally connect through links 153 to central-outer regions of hooks 132.

In order to cause pivotal movement of lock bars 25 to the wide-open positions shown in FIG. 17, thus greatly facilitating lateral introduction of the pipe 28–30 (FIG. 3) into the test chamber 27, an additional cylinder 154 is provided as best shown in FIG. 19. One end of cylinder 154 is pivotally connected to bracket 156 which, in turn, is bolted to one of ribs 16. The other end of cylinder 154 is connected to a crank 157 which is mounted on one of the lock bars 25. Such one lock bar 25 is, in turn, connected to all of the other lock bars by means of a vertical connector bar 158. Bar 158 is held in place by screws, in such manner that there is a rigid association between all of the lock bars 25 whereby they will close to precise positions determined by stop means described below.

After the apparatus has been unlocked and unhooked, the casing may be opened to the position shown in FIG. 17 by operation of cylinders 161 only one of which is shown. One end of each cylinder 161 is pivoted at 162 to a pin which extends between the upper and lower walls of housing 26. The other end of each such cylinder is pivoted at 163 to a bracket 164 bolted to one of the ribs 15.

In the general operation of the tool as thus-far described, the pipe elements 28–30 (FIG. 3) are introduced laterally into the apparatus when the casing and cage are in the wide-open position of FIG. 17, following which cylinders 161 are actuated to close the casing and cage. Cylinder 154 is operated to pivot the lock bars 25 to the closed position of FIGS. 16 and 19, cylinder 146 is operated to effect pivotal movement of hooks 132 to positions adjacent index and closing pins 141, and cylinders 137 are operated to cause the hooks to shift pins 141 and thereby effect pressure closing of the casing despite the presence of the protruding rubber in the seal means.

The lock pin 20 is then shifted downwardly as described below, creating a very strong locking action which prevents the casing and cage from opening despite the extreme test pressures present in the annular test chamber 27. It is of much importance that the parts be properly registered in order that the lock pin 20 may thus be shifted to locking condition, and the means additional to bars 85 for effecting such precise registry are described hereinafter.

After the test chamber 27 (FIG. 3) is thus defined, and sealed as stated above, fluid (preferably water) under very high pressure is injected into the test chamber from a pressure source represented schematically at 166 in FIG. 6. Such source 166 connects through a pipe 167 to a port 168 in casing portion 11. Because of the fact that the test chamber is not defined by a rubber packer, but instead primarily by metal, mounting and sealing the pipe 167 (the fitting connecting the same to port 168) is much simplified.

After the pressure in test chamber 27 reaches a very high value, which may be tens of tousands of psi, introduction of fluid from source 166 is stopped. It is then determined whether or not the pressure in test chamber 27 reduces. If there is no reduction, it means that there is no leak in the interconnected pipe elements 28–30. If the pressure does reduce, it means that fluid is leaking inwardly from the test chamber 27 through one or more joints between elements 28–29 and the collar 30. The pressure is read by a gauge means which is represented schematically at 169 in FIG. 1.

The lock pin 20 is connected to a piston 171 (FIG. 1) which is mounted slidably in a vertical cylinder housing 172 having a flange 173 at the lower end thereof. Flange 173 is suitably connected by means, not shown, to a corresponding plate 174 which is mounted by the previously-indicated bolts 143 and 144 to the uppermost rib 15 (FIG. 2). The position of mounting is such that the pin 20 registers with the uppermost bore (described below) in ribs 15.

Cylinder housing 172 is sufficiently long that piston 171 may be shifted upwardly until the lower end of pin 20 is above the uppermost lock bar 25, as shown in FIG. 2, thus permitting all of the lock bars 25 to be pivoted outwardly about pin 19 as shown in FIG. 17, and in response to operation of cylinder 154. As in the case of the various cylinders 137, 146, 154 and 161 described above, cylinder housing 172 is associated with suitable hydraulic lines (or pneumatic lines), and with valves which are incorporated in housing 26. Each of these cylinders is double acting, so that operation of the associated valve means (not shown) may shift the various pistons on both directions.

As shown in FIG. 2, the lower end of lock pin 20 is beveled at 176. This, however, is only a safety precaution, it being emphasized that before cylinder 172 may be operated to shift piston 171 and pin 20 downwardly to the lock position shown in dashed-lines in FIG. 1, the various bores in lock bars 25, and the corresponding bores in ribs 15, must be in registry in order to insure that the pin will not bind. As another safety precaution, the lock pin diameter is made slightly undersize (for example, 0.020 inch) relative to the bore diameter.

Figure 11:
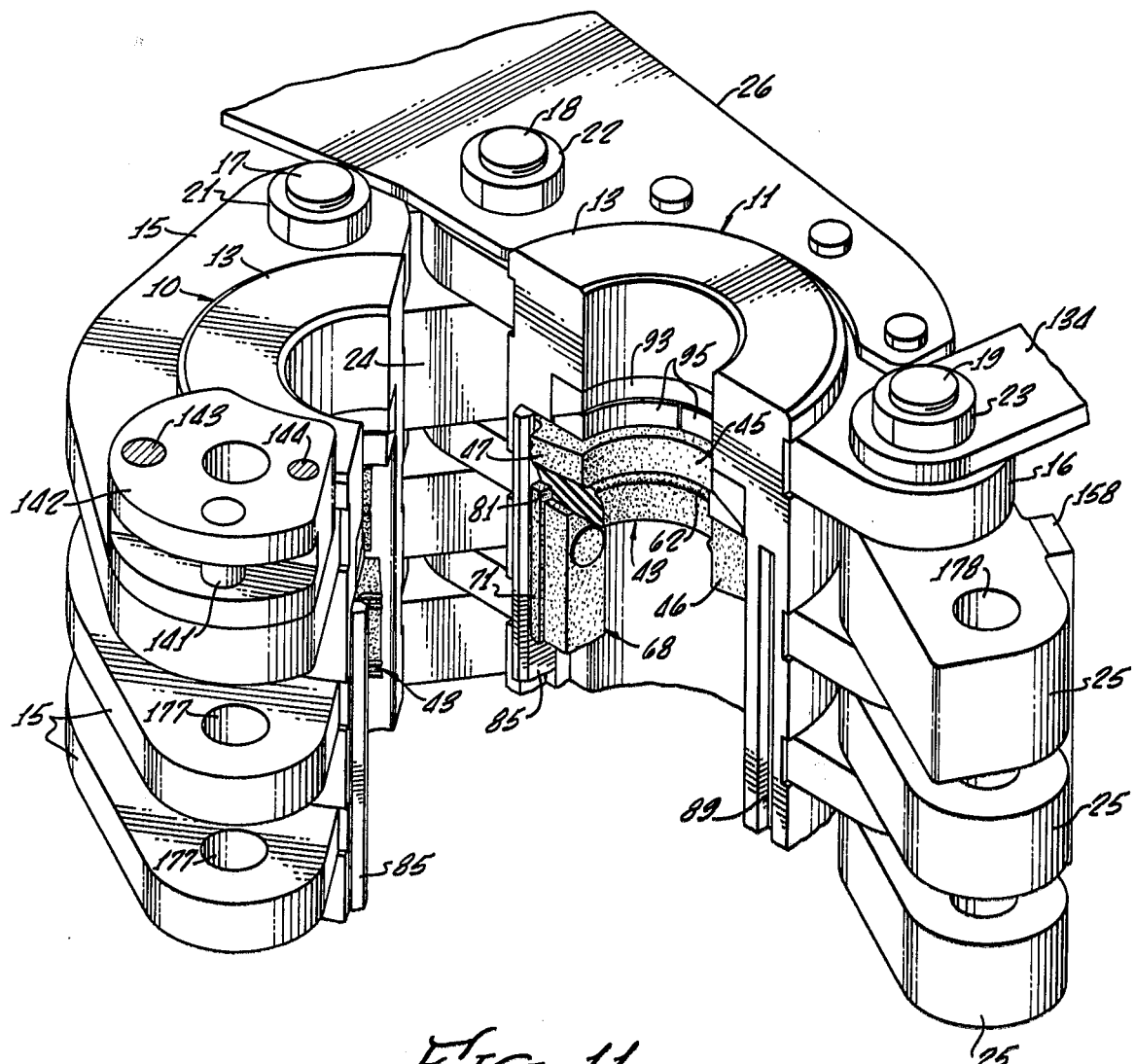
FIG. 11 is an isometric view showing in open condition the upper portion of the leak-testing apparatus, a showing of the vertical lock cylinder and lock pin being omitted.

In FIGS. 2 and 11, the bores in ribs 15 are numbered 177, whereas the bores in lock bars 25 are numbered 178. Each set of such bores has a common axis. There are three means for causing bores 177 and 178 to register with each other and to be in alignment with pin 20, such means being described in detail below.

The first means for effecting registry or alignment of bores 177 and 178 in elements 15 and 25, so that pin 20 may be readily inserted by the piston means, constitute the hooks 132 and the associated seal rubber. Referring particularly to FIG. 15a, it is to be noted that the protruding hook portion 179 of each hook 132 has mounted thereon a shim 180 and also a recessed pad 181 formed of hard metal. Shim 180 is interposed between the hook portion 179 and the recessed pad 181, being held in position by the illustrated screw means. The recess in pad 181 is adapted to provide a close fit with the index and closing pin 141.

The thickness of shim 180 is so adjusted, by empirical methods, that when the apparatus is in the fully-closed position of FIGS. 1 and 15, but prior to the insertion of lock pin 20 through the bores 177 and 178, such bores will be in registry (relative to one of two perpendicular planes) as shown in FIG. 2.

It is emphasized that the rubber in the seal means effects continuous forcing of index pin 141 against the recessed pad 181 when the apparatus is fully closed. Thus, the interrelationships between the rubber in the seal means, the shimmed pad 181, and the hooks 132 effectively position the parts in such manner that there is registry relative to one of two perpendicular planes.

To provide registry relative to the other of the two planes, such two planes being vertical and being perpendicular to each other, stop means 182 are provided as shown in FIGS. 18 and 18a. Such stop means 182 constitute the second means for effecting the above-indicated registry or alignment of the bores. Stated more definitely, there are two pairs of stops 182, one below the uppermost rib 15 and one above the lowermost rib 15 (the latter pair, not shown, being the mirror image of the former). The stops 182 in each pair are adapted to be engaged, as shown in FIGS. 18 and 18a, by straight rear side portions of the uppermost and lowermost lock bars 25, thus determining the positions of such lock bars when cylinder 154 is pressing thereagainst (maintaining the lock bars closed as distinguished from open).

Shims 183 (FIG. 18a) may be provided adjacent each stop means 182 to determine the precise closed positions of the lock bars 25. All of the lock bars 25 are connected correspondingly, for example by means of the connector bar 158, in such manner that only the two pairs of stop means 182 (and associated shims 183) need be provided. It is, however, pointed out that, if desired or necessary, shims may be interposed between connector bar 158 and various ones of the associated lock bars 25 in order to effect precision adjustment of the latter.

Preferably, one stop 182 in each pair is secured by screws to the underside of one rib 15, whereas the other stop 182 in each pair is secured by screws to the upper side of the adjacent rib 15.

To minimize wear and jarring in the apparatus, the cylinder 154 which closes the lock bars 25 to the position of FIG. 19 may be provided with suitable spring means to cushion the shock, so that the bars 25 cannot slam against the stops 182 but instead engage the same gently. Other and equivalent means for this purpose may comprise restrictor valves, rubber elements, etc.

In summary, therefore, the stop and shim means 182-183 (FIGS. 18 and 18a) adjust the lock bars 25 (when in closed condition), relative to a plane $P_4$ (FIG. 18) containing the axis of the bores 177 in ribs 15, until the common axis of the bores 178 lies in such plane $P_4$. The hook and shim means shown in FIGS. 15 and 15a adjust relative to a second plane $P_3$ (FIG. 18), also containing the common axis of the bores 177 in ribs 15, until the common axis of the bores 178 is in such plane $P_3$. As indicated above, the planes $P_3$ and $P_4$ are perpendicular to each other and intersect at the common axis of bores 177.

The third means for effecting precise registry of bores 177 and 178 in order that the lock pin 20 may be inserted therethrough is (like the hooks 132 and associated inde and closing pins 141) also important in creating and maintaining the seals for the test chamber 27. Such third means comprises the above-described combination extrusion-prevention and index bars 85 and their associated grooves 89, these being shown (for example) in FIGS. 6, 8 and 11.

SUMMARY OF OPERATION

Let it be assumed that the apparatus is initially in the wide-open position shown in FIG. 17, and that the seal means have not as yet been mounted therein. Let it also be assumed that the shims 180 and 183 (FIGS. 15a and 18a) and the bars 85 have been so predetermined that, when the apparatus is closed, the bores 178 will be in registry with bores 177 (FIGS. 2 and 11).

As previously indicated, the arcuate seal segments 43 are identical with each other, as are the longitudinal seal strips 68, so that all of these seal elements may be molded in only two molds. Because of the small number of mold inserts in each mold, the molding operation is simple. Furthermore, the small sizes of the seal elements, and other factors, make them easy to manufacture, store and ship.

The longitudinal seal strips 68 are first mounted in position by inserting the screws 78 and tightening them, the parts then assuming the positions shown in FIG. 14a-only two sides of each seal strip being under initial sealing compression. Such tightening of screws 78 (and subsequent tightening of screws 58) is continued only a predetermined amount, namely until the bushings 76 (and 57) seat on the bottom walls of the grooves 32 and 33 (FIGS. 5 and 6). Thus, the precise amount of the initial sealing compression is determined by the length of the bushings, and by the lateral spacing of the holes (for screws 78) from side wall 34 (FIG. 8) of each groove means. The rounded edge 36 (FIG. 8) aids in the drawing of the seal strips into the groove means.

The four arcuate seal segments 43 are then mounted in position at the upper and lower ends of the apparatus. This is done by inserting and tightening the screws 56 and 58. As described above, the tightening of screws 58 also effects initial sealing compression relative to the protruding seal portions 48 and also relative to the tongues 81 which fit in the notches 82 or 83 in the arcuate seal segments.

The pipe 28–30 is then introduced laterally into the present apparatus, and valve means (not shown) are operated to effect extension of cylinders 161, thus pivoting casing section 10 counterclockwise from the position of FIG. 17 to a position relatively close to (but not at) that of FIG. 16. The pivotal movement stops when the faces 46–47 at the ends of the arcuate seal segments engage each other, and when the uncompressed flanges 71 of the seal strips 68 engage walls 35 of the casing sections. Thus, cylinders 161 do not effect the achievement of much augmented sealing compression in various seals, and they need not be powerful cylinders.

Cylinder 154 (FIG. 19) is then extended to effect clockwise pivotal movement of the lock bars 25 from the position of FIG. 17 to that of FIGS. 15, 16, 18 and 19, the lock bars nesting between the ribs 15 of the cage. Such pivotal movement continues until stops 182 (FIGS. 18 and 18a) are engaged. The operation of cylinder 154 is effected by manipulating suitable valve means, not shown.

At approximately the same time that the lock bars 25 are pivoted as described above, cylinder 146 (FIG. 18) is shortened to cause clockwise pivotal movement of cranks 152 (FIGS. 1 and 18) and thus pivot hooks 132 clockwise until the pads 181 are adjacent index pins 141 (near but not at the positions of FIGS. 15 and 15a). The pins 141, and the stroke of cylinder 146, limit the amount of such clockwise movement of the hooks 132.

Thereafter, cylinders 137 are shortened, through the operation of suitable unshown valve means, to cause levers 134 to pivot counterclockwise, thus pulling the pads 181 (against the bias of the seal rubber) until the index pins 141 are in predetermined positions determined by the shims 180 (FIG. 15a). As described, these predetermined positions caused by shims 180 and by the stop means 182 are such that the bores 177 and 178

(FIG. 2) are in substantially precise alignment with each other and with pin 20.

Cylinder 172 is then operated, through manipulation of suitable valve means, not shown, to cause downward movement of lock pin 20 through bores 177 and 178, all the way to the bottom of the apparatus.

When the casing is closed to its final position of FIG. 15, the desired augmented sealing compression is created at interfaces 46 and 47 and at the flanges 71, beads 62–67, and other parts. Very importantly, such augmented sealing compression is then effected at the sides and edges of the protuberances 48 of the arcuate seal segments, augmenting the compression created when screws 58 are tightened. In this regard it is emphasized that the as-molded protuberances 48 are much wider than their grooves 32–33 when the apparatus is closed, so that closing of the casing causes much compression of elements 48 just as it compresses flanges 71, etc. Thus, the sealing compression resulting from closing of the casing is added to that created initially by the screws 56, 58 and 78, to result in a large degree of sealing prior to the time that any fluid is introduced into the test chamber 27.

It is emphasized that the above-described extension of cylinders 161 causes proper mating of the casing sections 10 and 11 due to several factors, including the seating of the arcuate seal segments 43 on the pipe, and due to introduction of beveled bars 85 into grooves 89. Such beveled bars 85 cooperate (FIGS. 14a and 8) with grooves 89 to aid in the indexing function described above relative to the shims 180 and 183.

The apparatus thus being closed and effectively sealed, fluid (preferably water) is introduced (by operating a suitable valve) from source 166 (FIG. 6) through pipe 167 into test chamber 27, and fluid pressure is increased until it is many thousands of psi- preferably above twenty thousand psi. This fluid pressure in the test chamber creates the final sealing compression in the various seals, since it energizes such seals and increases the pressures at the interfaces. The pressure is read by the gauge 169 and, when full test pressure is reaches, the introduction of fluid is stopped. Then, the operator waits a few seconds to see whether there is any loss of pressure (indicating a leak into the pipe through one of the joints between pipe sections 28–29 and collar 30).

After the test is thus completed, pressure is released from the test chamber through the pipe 167 (by operation of suitable valve means associated with pressure source 166), following which the above-described sequence of cylinder operation is repeated but in the reverse manner whereby the apparatus is returned to its fully-open condition of FIG. 17. The pipe is then removed, and the described operating cycle repeated for another pipe joint.

The present apparatus may also incorporate gear teeth (not shown) which are mounted on the casing halves in mutually-meshing relationship, between the hinge pins 17 and 18, and which insure that predetermined relationships will be maintained between the opposed casing sections 10 and 11 (and associated cage elements) as the jaws open and close.

Instead of providing a single interior bead 62 in each arcuate seal segment, there may be two or more such interior beads. It is now thought preferable to provide one interior bead adjacent the upper surface of each arcuate seal segment, and a second interior bead adjacent the lower surface thereof.

The radial end faces of inserts 50 aid greatly in creating sealing compression at faces 46–47.

It is now preferred to form each longitudinal and arcuate seal element of natural rubber, such rubber having a Shore hardness in the range of about 70 to about 75.

The foregoing detailed description is to be clearly understood as given by way of illustration and example only, the spirit and scope of this invention being limited solely by the appended claims.

We claim:

1. Apparatus for detecting leaks in joints in pipe sections, which comprises:
    (a) casing means adapted to open for lateral reception of a jointed pipe section, and then to close to define a chamber around at least one joint in said pipe section,
    (b) means to lock said casing means in closed condition,
    (c) means to seal said chamber without the necessity of employing a packer therein,
        said seal means including a longitudinal strip seal for sealing a longitudinal joint between opposed regions of said casing means when the latter is in closed condition,
        said strip seal having a rubber body adapted to be deformed in response to closing of said casing means, and to be further deformed in response to creation of high fluid pressures within said chamber, said rubber body of said longitudinal strip seal having molded therein substantially non-deformable insert means adapted to cooperate with said longitudinal strip seal in sealing very high fluid pressures in said chamber,
        said seal means further, including end seal means provided around said pipe section at the ends of said chamber to prevent escape of high-pressure fluid longitudinally of said pipe section,
    (d) means to create a very high fluid pressure in said sealed chamber, and
    (e) means to indicate a reduction in the fluid pressure in said chamber, thus indicating the presence of a leak in a joint in said pipe section.

2. The invention as claimed in claim 1, in which means are associated with said insert means to effect mounting of said strip seal to one of said opposed regions of said casing means, and also to effect an initial deformation of said rubber body to thereby achieve an initial seal relative to said casing means.

3. The invention as claimed in claim 2, in which said insert means comprises bar means extending longitudinally of said longitudinal strip seal, in which a substantial amount of said rubber body is interposed between said bar means and the region of said casing means to which said strip seal is adapted to be mounted, and in which fasteners are provided to connect said casing means region to said bar means and to effect initial compression of the portion of said rubber body between said bar means and said casing region.

4. The invention as claimed in claim 2, in which said insert means is embedded is said rubber body of said longitudinal strip seal, in which bushings are connected to said insert means and extend a portion of the way toward a surface of said rubber body but do not extend all of the way to such surface, and in which fastener means are associated with said casing, insert means, and bushings in such manner that said bushings limit the degree of tightening which said fastener means may effect, thus predetermining the initial compression of the portion of said rubber body between said insert means and a surface of said casing means.

5. Apparatus for detecting leaks in joints in pipe sections, which comprises:
(a) casing means adapted to open for lateral reception of a jointed pipe section, and then to close to define a chamber around at least one joint in said pipe section,
(b) means to lock said casing means in closed condition,
(c) means to seal said chamber without the necessity of employing a packer therein,
said seal means comprising end seals for the ends of said chamber,
said seal means further comprising a longitudinal strip seal mounted in a recessed longitudinal edge region of one section of said casing means and adapted to be compressed, in response to closing of said casing means, by a wall means associated with an opposed section of said casing means,
said wall means and said recessed edge region defining a groove wherein said strip seal is disposed in compressed condition when said casing means is in closed condition, said longitudinal strip seal having a rubber body adapted to be deformed in response to closing of said casing means to thus define said groove, and to be further deformed in response to creation of high fluid pressures within said chamber,
(d) means to create a very high fluid pressure in said sealed chamber, and
(e) means to indicate a reduction in the fluid pressure in said chamber, thus indicating the presence of a leak in a joint in said pipe section.

6. The invention as claimed in claim 5, in which said groove has an open side disposed relatively adjacent said pipe section and exposed to said chamber, whereby fluid pressure in said chamber compresses said strip seal in said groove and creates energization of said strip seal and consequent final sealing compression.

7. The invention as claimed in claim 6, in which means are provided on the side of said strip seal relatively remote from said pipe section to prevent outward extrusion of rubber in response to high fluid pressures in said chamber, said extrusion-prevention means overlapping said wall means in close relationship, whereby stretching of said casing means does not reduce efficacy of the extrusion-prevention function.

8. The invention as claimed in claim 5, in which relatively nondeformable insert means are provided in said rubber body of said longitudinal strip seal, in which bushings are provided in connected relationship on said inserts and extended toward the radial-outward surface of said rubber body but not completely to such radial-outward surface, and in which screws extend through said casing means into said bushings and are adapted to draw said bushings into contact with said casing means to thereby effect a predetermined degree of initial compression of said strip seal.

9. The invention as claimed in claim 5, in which said wall means associated with an opposed section of said casing means comprises a radial wall of such opposed section, said radial wall being generally in radial alignment with two opposed radial end faces of said casing sections when said casing means is closed, and in which an extrusion-prevention bar is mounted in said one casing section outwardly adjacent said strip seal, and extends closely into a recess or indentation in said opposed casing section.

10. The invention as claimed in claim 9, in which said extrusion-prevention bar has beveled edges and seats closely in a recess in said opposed casing section, whereby said bar not only provides an extrusion-prevention function which does not diminish with stretching of said casing means, but also performs an indexing function to aid in achieving precise registry between said casing sections.

11. The invention as claimed in claim 5, in which the as-molded condition of said longitudinal strip seal is such that it has flanges thereon relatively adjacent the bottom of said groove, whereby to increase the concentration of sealing pressures at said groove bottom.

12. Apparatus for detecting leaks in joints in pipe sections, which comprises:
(a) casing means adapted to open for lateral reception of a jointed pipe section, and then to close to define a chamber around at least one joint in said pipe section,
(b) means to lock said casing means in closed condition,
(c) means to seal said chamber without the necessity of employing a packer therein,
said seal means including means to seal the ends of said chamber,
said seal means further including a longitudinal strip seal for sealing a longitudinal joint between opposed regions of said casing means when the latter is in closed condition,
said strip seal having a rubber body which is mounted in a recessed edge region of one section of said casing means, the cross-sectional size of said rubber body being sufficiently large that one portion of said rubber body protrudes outwardly, when said casing means is in open condition, toward a wall means associated with an opposed section of said casing means, whereby closing of said casing means effects compression of said rubber body,
(d) an extrusion-prevention means formed of substantially nondeformable material and adapted to bridge the gap between said one casing section and said opposed casing section when said casing means is in closed condition,
said extrusion-prevention means being disposed radially-outwardly of said rubber seal body and preventing substantial radial outward extrusion of said rubber through said gap,
(e) means to create a very high fluid pressure in said sealed chamber, and
(f) means to indicate a reduction in the fluid pressure in said chamber, thus indicating the presence of a leak in a joint in said pipe section.

13. The invention as claimed in claim 12, in which said extrusion-prevention means comprises surface means forming the bottom of said recessed edge region of said one casing section and extending outwardly therefrom to overlap the opposed casing section when said casing means is in closed condition, whereby stretching of said casing means does not diminish the extrusion-prevention function.

14. The invention as claimed in claim 13, in which said surface means is provided with a bevel at the region thereof which engages the opposed casing section, (d) means to pressurize said chamber and to indicate when the pressure in said test chamber is reducing, thus indicating a leak in a joint in said casing section.

27. The invention as claimed in claim 26, in which portions of said annular end seal elements and said longitudinal strip seal elements overlap each other, and in which said means recited in clause (c) comprises means to compress said overlapped portions together.

28. The invention as claimed in claim 27, in which said compression means comprises an insert mounted in one of said overlapped seal portions and associated with fastener means, said fastener means being adapted when tightened to create high pressure between said overlapped portions.

29. Apparatus for testing pipe joints for leaks, comprising:
(a) a casing formed of first and second casing sections which are hinged to each other at one set of corresponding edges and are adapted to lock to each other at the other set of corresponding edges,
whereby said casing may open to laterally receive a jointed pipe section, and may then close and lock to define a test chamber around said jointed pipe section,
(b) interrelated end-seal means and longitudinal seal means respectively adapted to seal the ends of said chamber for prevention of fluid escape in a longitudinal direction, and to seal the joints between said casing sections for prevention of fluid escape in radial directions,
said end-seal means comprising arcuate seal elements having rubber bodies,
each such body having a radially-outwardly extending protruberant portion,
said longitudinal seal means comprising elongated strips also having rubber bodies,
(c) groove means provided longitudinally of said casing adjacent said chamber along the regions of proximity between said casing sections when said casing is in closed condition,
(d) means to mount said longitudinal seal means in said groove means in such relationships that said longitudinal seal means are in compressed sealing condition when said casing is in closed condition,
(e) means to mount said arcuate seal elements at the ends of said longitudinal seal means and in such relationships that said protuberant portions are in compressed sealing conditions in said groove means when said casing is in closed condition,
at least one of said mounting means being such that said protuberant portions of said arcuate seal segments are in sealing engagement with said longitudinal seal means, and
(f) means to pressurize said test chamber and to indicate loss of pressure therefrom.

30. The invention as claimed in claim 29, in which regions of said longitudinal seal means are in overlapping relationship relative to regions of said arcuate seal elements, and in which said mounting means recited in clause (e) comprises means to compress the overlapping regions to effect sealing therebetween.

31. The invention as claimed in claim 29, in which tongues are provided on the ends of said longitudinal seal means adjacent the bottom of said groove means, in which recesses shaped to receive said tongues are provided in said protuberant portions of said arcuate seal elements, in which inserts are mounted in said protuberant portions of said arcuate seal elements and radially-outwardly of said tongues, and in which means are provided to shift said inserts radially-outwardly to thereby compress said tongues in said groove means.

32. The invention as claimed in claim 31, in which the ends of said arcuate seal elements are adapted to engage each other in compressed sealing relationship, the regions of engagement being circumferentially offset from said groove means.

33. The invention as claimed in claim 32, in which an extrusion-prevention bar is mounted in said casing means and extends for the full length of said groove means, both adjacent said end seal means and adjacent said longitudinal seal means, said extrusion-prevention bar protruding circumferentially past and in close proximity to a generally radial surface of the casing section to which said bar is not mounted, whereby stretching of said casing does not reduce the extrusion-prevention function relative to both said end seal means and said longitudinal seal means.

34. The invention as claimed in claim 33, in which means are provided at the ends of said casing to prevent extrusion of said end seal means in directions longitudinally of the pipe section.

35. The invention as claimed in claim 33, in which said bar is beveled and extends snugly into recess means in said casing section to which said bar is not mounted, whereby said bar serves not only to prevent extrusion but also to effect precise indexing between the casing sections.

36. The invention as claimed in claim 29, in which each of said end seal means is identical to each other of said end seal means, and each of said longitudinal seal means is identical to each other of said longitudinal seal means, whereby only two molds are required to mold all of said end seal means and longitudinal seal means.

37. The invention as claimed in claim 36, in which each of said casing sections is identical to each other of said casing sections, and in which inserts are provided in all of said seal means and sealing elements to effect mounting thereof and to effect initial compression against said casing sections.

38. Apparatus for testing pipes for leaks, which comprises:
(a) casing means adapted to open for lateral reception of a jointed pipe section, and then to close and lock to thus define an annular test chamber around such pipe section,
said casing means having two longitudinal edge portions which are adjacent each other when said casing means is in closed condition, and which must be sealed to prevent leakage of high-pressure fluid from said test chamber.
one such edge portion being on one section of said casing means, another such edge portion being on another section of said casing means,
(b) means to define a first wall which projects outwardly from said one edge portion in a generally circumferential direction,
said first wall intersecting a second wall which is formed on said one edge portion and extends in a generally radial direction,
(c) means to define a third wall on said other edge portion and which is partially overlapped by said first wall when said casing means is in closed condition,
said third wall extending in a generally radial direction and intersecting said first wall transversely thereby backing up the rubber body of said strip seal and preventing pinching thereof.

15. The invention as claimed in claim 14, in which said strip seal has a flange relatively adjacent said bevel.

16. The invention as claimed in claim 12, in which said extrusion-prevention means is adapted to fit closely relative to adjacent regions of opposed casing sections to thereby index the casing sections and effect proper registry therebetween.

17. Apparatus for effecting external testing for leakage in pipe joints, which apparatus comprises:
   (a) a casing which is longitudinally divided into at least two sections whereby the casing may open for lateral reception of a jointed pipe section and may thereafter close on said pipe section to thus define a test chamber therearound,
   (b) means to lock said casing in closed condition on said pipe,
   (c) means to seal against leakage the longitudinal joints between said sections,
   (d) means to seal the two ends of said test chamber, each of said end seal means comprising at least two arcuate seal segments having rubber bodies and adapted to seat in said casing in encompassing relationship relative to said pipe section,
      the four ends of said two arcuate seal segments being seal faces adapted to engage each other in compressive sealing relationship when said casing is in closed condition,
   (e) means to mount one of said arcuate seal segments to one section of said casing, and to mount the other of said arcuate seal segments to the other section of said casing,
   (f) means to create a very high fluid pressure in said sealed test chamber, and
   (g) means to indicate a reduction in said fluid pressure to thus indicate the presence of a leak in at least one of the joints of said jointed pipe section.

18. The invention as claimed in claim 17, in which each of said arcuate seal segments has insert means molded therein, and in which fastener means are associated with said insert means to mount said arcuate seal segments to said casing sections and to provide initial compression between said seal segments and said casing sections.

19. The invention as claimed in claim 17, in which the rubber body of at least two of said arcuate seal segments have radially-outwardly extending protuberant regions adapted to seat in groove means in said casing and to be compressed in response to closing of said casing.

20. Apparatus for effecting external testing for leakage in pipe joints, which apparatus comprises:
   (a) a casing which is longitudinally divided into at least two sections whereby the casing may open for lateral reception of a jointed pipe section and may thereafter close on said pipe section to thus define a test chamber therearound,
   (c) means to lock said casing in closed condition on said pipe section,
   (c) means to seal against leakage at least one longitudinal joint between said casing sections,
      said longitudinal seal means being formed primarily of rubber and being mounted in a longitudinal groove in said casing,
         said groove being adjacent a region of proximity between said two casing sections when said casing is in closed condition,
   (d) means to seal the two ends of said test chamber, said end seal means comprising circumferential seal means formed primarily of rubber and mounted in said casing,
      each of said circumferential seal means having at least two end faces adapted to abut in compressive sealing relationship, each of said circumferential seal means also having a radially-outwardly extending protuberant portion adapted to seat in said longitudinal groove in said casing,
   (e) means to create a very high fluid pressure in the sealed test chamber, and
   (f) means to indicate a reduction in said fluid pressure to thus indicate the presence of a leak in at least one of the joints of said jointed pipe section.

21. The invention as claimed in claim 20, in which said protuberant portions are respectively circumferentially offset from said abutted end faces of said circumferential seal means, whereby there is no relative sliding movement between said circumferential seal means and said longitudinal seal means when said casing opens and closes.

22. The invention as claimed in claim 20, in which insert means are molded in said circumferential seal means, said insert means being present in said radially-outwardly extending protuberant portions, and in which fastener means are adapted to effect connections between said casing and said insert means to shift said insert means radially-outwardly and thus achieve initial compression between said protuberant portions and said casing.

23. The invention as claimed in claim 22, in which said insert means in said protuberant portion is generally wing shaped and is adapted to create high sealing pressures relative to corner portions of said casing at the sides of said longitudinal groove.

24. The invention as claimed in claim 22, in which additional insert means are molded in said circumferential seal means and comprise arcuate inserts in the portions of said circumferential seal means extending away from said protuberant portions, and in which additional fastener means are connected to said arcuate inserts to draw the same outwardly toward said casing.

25. The invention as claimed in claim 24, in which each of said arcuate inserts has upwardly and downwardly-extending large teeth thereon, said teeth being spaced apart whereby to permit flow of rubber therebetween under extremely high pressures.

26. An external tester for testing pipe joints by creating very high fluid pressures in the regions exteriorly around the joints, which comprises:
   (a) a casing adapted to open for lateral reception of a jointed pipe section, and to close and lock to thus define a test chamber around said pipe section,
   (b) means to seal said test chamber without the necessity of lining the walls thereof with rubber,
      said sealing means comprising annular end seal elements at the ends of said test chamber, to prevent escape of fluid from said test chamber in directions longitudinal to the pipe, said sealing means further comprising strip seal elements extending longitudinally of said test chamber for sealing of the longitudinal joints between adjacent sections of said casing,
   (c) means to prevent leakage of fluid through the regions of proximity between said annular and strip seal elements, and thereof when said casing means is in closed condition, (d) a longitudinal seal strip having a rubber body and being mounted in said casing means in such manner that it engages said first and second walls at all times and is compressed by said third wall when said casing means is in closed condition, said seal strip being on the side of said first wall relatively adjacent said pipe section and being exposed to said test chamber, whereby said transversely-intersecting first and second walls prevent extrusion of said rubber body despite stretching of said casing in response to high pressure in said test chamber, (e) means to seal the ends of said test chamber, and (f) means to create a high fluid pressure in said test chamber, and to indicate when said pressure is reducing due to a leak in said jointed pipe section.

39. The invention as claimed in claim 38, in which said wall recited in clause (b) is on an extrusion-prevention element which fits snugly in a recess in said other edge portion when said casing means is in closed condition, to thereby provide an indexing function aiding in achieving proper registry between the sections of said casing means when in closed condition.

40. The invention as claimed in claim 38, in which means are provided to initially compress said seal strip against said first and second walls.

41. A method of externally high-pressure testing a jointed pipe section for leakage, without the necessity of using large and expensive packer means which lines the test chamber with rubber, said method comprising:

(a) providing a casing adapted to open for lateral reception of a jointed pipe section, and then to close and lock to define a test chamber around said pipe section, (b) providing a plurality of elongated strip-seal elements each having a rubber body, (c) providing a plurality of arcuate seal segments each having a rubber body, (d) mounting, while said casing is in open condition, said strip-seal elements and said arcuate seal segments to said casing and in such manner that initial sealing compression is achieved prior to closing of said casing, the manner of said mounting, and the shapes of said seal elements and segments, and of said casing, being such that full closing of said casing on said jointed pipe section will achieve augmented sealing compression at said seal elements and segments to thus effect sealing of said test chamber, (e) fully closing and locking said casing on said jointed pipe section to thus achieve said augmented sealing compression, (f) injecting fluid into said test chamber to a pressure of many thousands of pounds per square inch, thus achieving final sealing compression due to pressurization of said strip-seal elements and said arcuate seal segments, and (g) determining whether or not there is a reduction of the fluid pressure after said injecting step (f) has terminated, said reduction indicating radial-inward leakage of fluid from said test chamber through said jointed pipe section.

42. A set of seals for an external testing apparatus adapted to determine the presence or absence of a leak in a pipe joint, comprising:

(a) at least two longitudinal seals each adapted to seal a longitudinal joint between two sections of the casing of said testing apparatus, said longitudinal seals each having a rubber body, and (b) at least four arcuate seal segments each two of which are adapted to be employed in sealing the ends of the test chamber in said testing apparatus, said arcuate seal segments each having a rubber body, at least some of said arcuate seal segments having protuberant portions adapted to engage sealingly the end portions of said longitudinal seals when all of said sealing elements are in mounted condition in said casing.

43. The invention as claimed in claim 42, in which each of said lontigudinal seals has insert means therein adapted to be connected to the casing of said testing apparatus, and in which each of said arcuate seal segments has insert means therein adapted to be connected to said casing.

44. The invention as claimed in claim 42, in which the ends of each two of said arcuate seal segments are adapted to engage each other in sealing relationship whereby said two arcuate seal segments extend for 360 degrees around the pipe, and in which the regions of engagement of said ends are circumferentially offset from said protuberant portions.

45. The invention as claimed in claim 44, in which all of said arcuate seal segments are identical to each other and all of said longitudinal seals are identical to each other, whereby only two molds are required to mold said longitudinal and arcuate seal elements.

46. A set of seals for an external testing apparatus adapted to determine the presence or absence of a leak in a pipe joint, comprising:

(a) at least two longitudinal seals each adapted to seal a longitudinal joint between two sections of the casing of said testing apparatus, said longitudinal seals each having a rubber body, (b) at least four arcuate seal segments each two of which are adapted to be employed in sealing the ends of the test chamber in said testing apparatus, said arcuate seal segments each having a rubber body, and (c) tongue and a recess means provided between the end portions of said longitudinal seals and at least some of said arcuate seal segments, the tongue portions of said tongue and recess means being adapted to be compressed to seal the intersection regions between said longitudinal and arcuate seals 47. The invention as claimed in claim 46, in which said tongue and recess means recited in clause (c) comprises tongues provided on the ends of said longitudinal seals, and recess means provided on at least some of said arcuate seal segments and shaped to sealingly receive said tongues, and in which said arcuate seal segments have inserts embedded therein and adapted to be moved toward said tongues to thus effect compression thereof.

48. External leak tester apparatus for determining the presence or absence of leaks in pipe joints, which apparatus comprises:

(a) casing means adapted to open a lateral reception of a pipe section and to close to thus define a test chamber around said pipe section, (b) seal means disposed in said casing means to seal the longitudinal joints between the sections of said casing means and also to seal the ends of said test chamber for prevention of escape of fluid longitudinally of the pipe section, at least some of said seal means having molded rubber bodies in which substantially non-deformable inserts are disposed, (c) means to connect said casing to said inserts to mount said seal means and also to shift the positions of said inserts and thereby provide initial compression between said seal means and said casing, (d) means to limit to a predetermined amount the degree of movement of said inserts when achieving said initial compression, thus also predetermining the amount of initial compression, and (e) means to pressurize said test chamber and then to indicate whether or not said pressure is reducing.

49. The invention as claimed in claim 48, in which said means recited in clause (d) comprises bushings connected to said inserts and fasteners introduced through said casing and into said bushings, said fasteners being adapted to draw said inserts radially-outwardly until said bushings seat on said casing, said bushings when said seal means are in the as-molded uncompressed condition being recessed below the surfaces of said seal means.

50. A longitudinal seal for an external leak tester for a pipe joint, which comprises:
(a) an elongated molded rubber body, and
(b) at least one insert formed of non-deformable material and mounted in said body longitudinally thereof,
said insert having internally-threaded bushings secured thereto as spaced points therealong, said rubber body having openings therein adapted to permit access of screws to said bushings,
the ends of said bushings remote from said insert being recessed below the surface of said rubber body whereby turning of said screws is required in order to draw said insert and bushings outwardly until said bushings reach the surface of said rubber body.

51. The invention as claimed in claim 50, in which flanges are provided laterally on the edges of said rubber body, and in which said longitudinal seal means has a generally T-shaped cross section with a very wide stem, the ends of the cross bar of the T being said flanges.

52. The invention as claimed in claim 51, in which the corners of said flanges remote from said insert are rounded.

53. The invention as claimed in claim 50, in which tongues are provided at the ends of said rubber body and adapted to seat in recesses in associated arcuate seal elements.

54. A circumferential end seal means for an external leak testing apparatus for pipe joints, which comprises:
(a) an arcuate segment formed of molded rubber and having a radially-outwardly extending integral protuberant portion relatively adjacent one end thereof,
(b) a first insert molded in said body at said protuberant portion and adapted to be drawn radially-outwardly to compress said protuberant portion, and
(c) an arcuate insert provided in much of the remaining portion of said molded rubber body.

55. The invention as claimed in claim 54, in which a bushing is mounted on said first-mentioned insert and is adapted to receive a fastener adapted to effect said drawing of said first-mentioned insert radially-outwardly to compress said body.

56. The invention as claimed in claim 54, in which said arcuate insert has upper and lower large teeth which are spaced far apart whereby to provide for flow of rubber therebetween.

57. The invention as claimed in claim 54, in which the outer corners of said protuberant portion are recessed in order to receive tongues extending from the ends of longitudinal seal elements adapted to be associated with said arcuate seal elements.

58. The invention as claimed in claim 54, in which upper and lower recesses are provided in said protuberant portion above and below the fastener opening for said insert, each of said recesses being adapted to receive a tongue at the end of a longitudinal seal element.

59. The invention as claimed in claim 54, in which beads are provided externally and internally on said rubber body of said arcuate segment in order to increase the concentration of sealing forces at said beads, said beads being also present at said protuberant portion.

* * * * *

UNITED STATES PATENT OFFICE
CERTIFICATE OF CORRECTION

PATENT NO. : 4,099,405
DATED : July 11, 1978
INVENTOR(S) : Thomas D. Hauk and Ernest D. Hauk It is certified that error appears in the above-identified patent and that said Letters Patent are hereby corrected as shown below:

Column 4, line 48, cancel "in" and substitute --- In ---.

Column 8, line 17, cancel "relative" and substitute --- relatively ---; line 60, cancel "the" (first occurrence) and substitute --- and ---.

Column 14, line 30, cancel "on" and substitute --- in ---.

Column 15, line 55, cancel "inde" and substitute --- index ---.

Column 17, line 41, cancel "reaches" and substitute --- reached ---.

Column 21, line 58, cancel "(c)" and substitute --- (b) ---.

Column 24, line 53, cancel the period (.) and substitute a comma (,).

Column 26, line 52, after "seals" insert a period (.).

Column 27, line 33, cancel "as" and substitute --- at ---.

Signed and Sealed this

Sixth Day of November 1979

[SEAL]

Attest:

RUTH C. MASON
*Attesting Officer*

LUTRELLE F. PARKER
*Acting Commissioner of Patents and Trademarks*